(12) United States Patent
Lesso et al.

(10) Patent No.: US 12,248,551 B2
(45) Date of Patent: *Mar. 11, 2025

(54) METHODS, APPARATUS AND SYSTEMS FOR AUDIO PLAYBACK

(71) Applicant: Cirrus Logic International Semiconductor Ltd., Edinburgh (GB)

(72) Inventors: John Paul Lesso, Edinburgh (GB); John Forsyth, London (GB)

(73) Assignee: Cirrus Logic Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/495,236

(22) Filed: Oct. 26, 2023

(65) Prior Publication Data

US 2024/0061921 A1 Feb. 22, 2024

Related U.S. Application Data

(60) Continuation of application No. 18/101,843, filed on Jan. 26, 2023, now Pat. No. 11,829,461, which is a (Continued)

(30) Foreign Application Priority Data

Jan. 30, 2018 (GB) .................................. 1801532

(51) Int. Cl.
*G06F 21/00* (2013.01)
*G06F 3/16* (2006.01)
(Continued)

(52) U.S. Cl.
CPC .............. *G06F 21/32* (2013.01); *G06F 3/165* (2013.01); *G10K 11/17823* (2018.01);
(Continued)

(58) Field of Classification Search
CPC ... G06F 21/32; G06F 3/165; G10K 11/17823; G10K 11/1783; G10K 2210/3055;
(Continued)

(56) References Cited

U.S. PATENT DOCUMENTS 5,197,113 A 3/1993 Mumolo
5,568,559 A 10/1996 Makino
(Continued)

FOREIGN PATENT DOCUMENTS

AU 2015202397 B2 5/2015
CN 1497970 A 5/2004
(Continued)

OTHER PUBLICATIONS

Wu, Libing, et al., LVID: A Multimodal Biometricas Authentication System on Smartphones, IEEE Transactions on Information Forensics and Security, Vo. 15, 2020, pp. 1572-1585.
(Continued)

*Primary Examiner* — William A Corum, Jr.
(74) *Attorney, Agent, or Firm* — Jackson Walker L.L.P.

(57) ABSTRACT

The present invention relates to methods, apparatus and systems for audio playback via a personal audio device following a biometric process. A personal audio device may be used to obtain ear model data for authenticating a user via an ear biometric authentication system. Owing to that successful authentication, the electronic device is informed of the person who is listening to audio playback from the device. Thus the device can implement one or more playback settings which are specific to that authorised user.

20 Claims, 9 Drawing Sheets

Related U.S. Application Data division of application No. 17/034,816, filed on Sep. 28, 2020, now abandoned, which is a division of application No. 16/028,824, filed on Jul. 6, 2018, now abandoned.

(60) Provisional application No. 62/529,697, filed on Jul. 7, 2017.

(51) Int. Cl.
  *G06F 21/32* (2013.01)
  *G10K 11/178* (2006.01)
  *H04R 1/10* (2006.01)
  *G10L 25/51* (2013.01)
  *H04R 1/02* (2006.01)
  *H04R 29/00* (2006.01)

(52) U.S. Cl.
  CPC ....... *G10K 11/1783* (2018.01); *H04R 1/1041* (2013.01); *G10K 2210/1081* (2013.01); *G10K 2210/3055* (2013.01); *G10L 25/51* (2013.01); *H04R 1/028* (2013.01); *H04R 29/00* (2013.01)

(58) Field of Classification Search
  CPC .......... G10K 2210/1081; H04R 1/1041; H04R 1/028; H04R 29/00; G10L 25/51
  See application file for complete search history.

(56) References Cited

U.S. PATENT DOCUMENTS

| | | | |
|---|---|---|---|
| 5,710,866 A | 1/1998 | Alleva et al. | |
| 5,787,187 A | 7/1998 | Bouchard et al. | |
| 5,838,515 A | 11/1998 | Mortazavi et al. | |
| 6,182,037 B1 | 1/2001 | Maes | |
| 6,229,880 B1 | 5/2001 | Reformato et al. | |
| 6,249,237 B1 | 6/2001 | Prater | |
| 6,343,269 B1 | 1/2002 | Harada et al. | |
| 6,480,825 B1 | 11/2002 | Sharma et al. | |
| 7,016,833 B2 | 3/2006 | Gable et al. | |
| 7,039,951 B1 | 5/2006 | Chaudhari et al. | |
| 7,418,392 B1 | 8/2008 | Mozer et al. | |
| 7,492,913 B2 | 2/2009 | Connor et al. | |
| 8,442,824 B2 | 5/2013 | Aley-Raz et al. | |
| 8,489,399 B2 | 7/2013 | Gross | |
| 8,577,046 B2 | 11/2013 | Aoyagi | |
| 8,856,541 B1 | 10/2014 | Chaudhury et al. | |
| 8,997,191 B1 | 3/2015 | Stark et al. | |
| 9,049,983 B1* | 6/2015 | Baldwin ............ A61B 1/00039 | |
| 9,171,548 B2 | 10/2015 | Valius et al. | |
| 9,232,293 B1* | 1/2016 | Hanson ................ H04W 12/06 | |
| 9,305,155 B1 | 4/2016 | Vo et al. | |
| 9,317,736 B1 | 4/2016 | Siddiqui | |
| 9,390,726 B1 | 7/2016 | Smus et al. | |
| 9,430,629 B1 | 8/2016 | Ziraknejad et al. | |
| 9,484,036 B2 | 11/2016 | Kons et al. | |
| 9,548,979 B1 | 1/2017 | Johnson et al. | |
| 9,600,064 B2 | 3/2017 | Lee et al. | |
| 9,613,640 B1 | 4/2017 | Balamurali et al. | |
| 9,641,585 B2 | 5/2017 | Kvaal et al. | |
| 9,646,261 B2 | 5/2017 | Agrafioli et al. | |
| 9,659,562 B2 | 5/2017 | Lovitt | |
| 9,665,784 B2 | 5/2017 | Derakhshani et al. | |
| 9,706,304 B1* | 7/2017 | Kelso ................... H03G 3/3005 | |
| 9,865,253 B1 | 1/2018 | De Leon et al. | |
| 9,984,314 B2 | 5/2018 | Philipose et al. | |
| 9,990,926 B1 | 6/2018 | Pearce | |
| 10,032,451 B1 | 7/2018 | Mamkina et al. | |
| 10,063,542 B1 | 8/2018 | Kao | |
| 10,079,024 B1 | 9/2018 | Bhimanaik et al. | |
| 10,097,914 B2 | 10/2018 | Petrank | |
| 10,192,553 B1 | 1/2019 | Chenier et al. | |
| 10,204,625 B2 | 2/2019 | Mishra et al. | |
| 10,210,685 B2 | 2/2019 | Borgmeyer | |
| 10,255,922 B1 | 4/2019 | Sharifi et al. | |
| 10,277,581 B2 | 4/2019 | Chandrasekharan et al. | |
| 10,305,895 B2 | 5/2019 | Barry et al. | |
| 10,318,580 B2 | 6/2019 | Topchy et al. | |
| 10,334,350 B2 | 6/2019 | Petrank | |
| 10,339,290 B2 | 7/2019 | Valendi et al. | |
| 10,460,095 B2 | 10/2019 | Boesen | |
| 10,467,509 B2 | 11/2019 | Albadawi et al. | |
| 10,692,492 B2 | 6/2020 | Rozen et al. | |
| 10,733,987 B1 | 8/2020 | Govender et al. | |
| 10,847,165 B2 | 11/2020 | Lesso | |
| 10,915,614 B2 | 2/2021 | Lesso | |
| 10,977,349 B2 | 4/2021 | Suh et al. | |
| 11,017,252 B2 | 5/2021 | Lesso | |
| 11,023,755 B2 | 6/2021 | Lesso | |
| 11,037,574 B2 | 6/2021 | Lesso | |
| 11,051,117 B2 | 6/2021 | Lesso | |
| 11,164,588 B2 | 11/2021 | Alonso et al. | |
| 11,276,409 B2 | 3/2022 | Lesso | |
| 2002/0169608 A1 | 11/2002 | Tamir et al. | |
| 2002/0194003 A1 | 12/2002 | Mozer | |
| 2003/0033145 A1 | 2/2003 | Petrushin | |
| 2003/0177006 A1 | 9/2003 | Ichikawa et al. | |
| 2003/0177007 A1 | 9/2003 | Kanazawa et al. | |
| 2003/0182119 A1 | 9/2003 | Junqua et al. | |
| 2004/0030550 A1 | 2/2004 | Liu | |
| 2004/0141418 A1 | 7/2004 | Matsuo et al. | |
| 2004/0230432 A1 | 11/2004 | Liu et al. | |
| 2005/0060153 A1 | 3/2005 | Gable et al. | |
| 2005/0107130 A1 | 5/2005 | Peterson, II | |
| 2005/0171774 A1 | 8/2005 | Applebaum et al. | |
| 2006/0116874 A1 | 6/2006 | Samuelsson et al. | |
| 2006/0171571 A1 | 8/2006 | Chan et al. | |
| 2007/0055517 A1 | 3/2007 | Spector | |
| 2007/0129941 A1 | 6/2007 | Tavares | |
| 2007/0185718 A1 | 8/2007 | Di Mambro et al. | |
| 2007/0233483 A1 | 10/2007 | Kuppuswamy et al. | |
| 2007/0250920 A1 | 10/2007 | Lindsay | |
| 2007/0276658 A1 | 11/2007 | Douglass | |
| 2008/0040615 A1 | 2/2008 | Carper et al. | |
| 2008/0071532 A1 | 3/2008 | Ramakrishnan et al. | |
| 2008/0082510 A1 | 4/2008 | Wang et al. | |
| 2008/0223646 A1 | 9/2008 | White | |
| 2008/0262382 A1* | 10/2008 | Akkermans ............ G06V 40/10 600/559 |
| 2008/0285813 A1 | 11/2008 | Holm | |
| 2009/0087003 A1 | 4/2009 | Zurek et al. | |
| 2009/0105548 A1 | 4/2009 | Bart | |
| 2009/0167307 A1 | 7/2009 | Kopp | |
| 2009/0232361 A1 | 9/2009 | Miller | |
| 2009/0281809 A1 | 11/2009 | Reuss | |
| 2009/0319270 A1 | 12/2009 | Gross | |
| 2010/0004934 A1 | 1/2010 | Hirose et al. | |
| 2010/0076770 A1 | 3/2010 | Ramaswamy | |
| 2010/0106502 A1 | 4/2010 | Farrell et al. | |
| 2010/0106503 A1 | 4/2010 | Farrell et al. | |
| 2010/0204991 A1 | 8/2010 | Ramakrishnan et al. | |
| 2010/0328033 A1 | 12/2010 | Kamei | |
| 2011/0051907 A1 | 3/2011 | Jaiswal et al. | |
| 2011/0075857 A1 | 3/2011 | Aoyagi | |
| 2011/0142268 A1 | 6/2011 | Iwakuni et al. | |
| 2011/0246198 A1 | 10/2011 | Asenjo et al. | |
| 2011/0276323 A1 | 11/2011 | Seyfetdinov | |
| 2011/0314530 A1 | 12/2011 | Donaldson | |
| 2011/0317848 A1 | 12/2011 | Ivanov et al. | |
| 2012/0110341 A1 | 5/2012 | Beigi | |
| 2012/0223130 A1 | 9/2012 | Knopp et al. | |
| 2012/0224456 A1 | 9/2012 | Visser et al. | |
| 2012/0249328 A1 | 10/2012 | Xiong | |
| 2012/0323796 A1 | 12/2012 | Udani | |
| 2013/0024191 A1 | 1/2013 | Krutsch et al. | |
| 2013/0058488 A1 | 3/2013 | Cheng et al. | |
| 2013/0080167 A1 | 3/2013 | Mozer | |
| 2013/0132091 A1 | 5/2013 | Skerpac | |
| 2013/0225128 A1 | 8/2013 | Gomar | |
| 2013/0227678 A1 | 8/2013 | Kang | |
| 2013/0247082 A1 | 9/2013 | Wang et al. | |
| 2013/0279297 A1 | 10/2013 | Wulff et al. | |
| 2013/0279724 A1 | 10/2013 | Stafford et al. | |

(56) References Cited

U.S. PATENT DOCUMENTS

| | | |
|---|---|---|
| 2013/0289999 A1 | 10/2013 | Hymel |
| 2014/0059347 A1 | 2/2014 | Dougherty et al. |
| 2014/0146979 A1 | 5/2014 | Puskarich |
| 2014/0149117 A1 | 5/2014 | Bakish et al. |
| 2014/0172430 A1 | 6/2014 | Rutherford et al. |
| 2014/0188770 A1 | 7/2014 | Agrafioti et al. |
| 2014/0237576 A1 | 8/2014 | Zhang et al. |
| 2014/0241597 A1 | 8/2014 | Leite |
| 2014/0293749 A1 | 10/2014 | Gervaise |
| 2014/0307876 A1 | 10/2014 | Agiomyrgiannakis et al. |
| 2014/0330568 A1 | 11/2014 | Lewis et al. |
| 2014/0337945 A1 | 11/2014 | Jia et al. |
| 2014/0343703 A1 | 11/2014 | Topchy et al. |
| 2014/0358353 A1 | 12/2014 | Ibanez-Guzman et al. |
| 2014/0358535 A1 | 12/2014 | Lee et al. |
| 2015/0006163 A1 | 1/2015 | Liu et al. |
| 2015/0028996 A1 | 1/2015 | Agrafioti et al. |
| 2015/0033305 A1 | 1/2015 | Shear et al. |
| 2015/0036462 A1 | 2/2015 | Calvarese |
| 2015/0088509 A1 | 3/2015 | Gimenez et al. |
| 2015/0089616 A1 | 3/2015 | Brezinski et al. |
| 2015/0112682 A1 | 4/2015 | Rodriguez et al. |
| 2015/0134330 A1 | 5/2015 | Baldwin et al. |
| 2015/0161370 A1 | 6/2015 | North et al. |
| 2015/0161459 A1 | 6/2015 | Boczek |
| 2015/0168996 A1 | 6/2015 | Sharpe et al. |
| 2015/0245154 A1 | 8/2015 | Dadu et al. |
| 2015/0261944 A1 | 9/2015 | Hosom et al. |
| 2015/0276254 A1 | 10/2015 | Nemcel et al. |
| 2015/0301796 A1 | 10/2015 | Visser et al. |
| 2015/0332665 A1 | 11/2015 | Mishra et al. |
| 2015/0347734 A1 | 12/2015 | Beigi |
| 2015/0356974 A1 | 12/2015 | Tani et al. |
| 2015/0371639 A1 | 12/2015 | Foerster et al. |
| 2016/0007118 A1 | 1/2016 | Lee et al. |
| 2016/0026781 A1* | 1/2016 | Boczek .................. G06V 40/10 726/18 |
| 2016/0066113 A1 | 3/2016 | Elkhatib et al. |
| 2016/0071516 A1 | 3/2016 | Lee et al. |
| 2016/0086607 A1 | 3/2016 | Aley-Raz et al. |
| 2016/0086609 A1 | 3/2016 | Yue et al. |
| 2016/0111112 A1 | 4/2016 | Hayakawa |
| 2016/0125877 A1 | 5/2016 | Foerster et al. |
| 2016/0125879 A1 | 5/2016 | Lovitt |
| 2016/0147987 A1 | 5/2016 | Jang et al. |
| 2016/0148012 A1 | 5/2016 | Khitrov et al. |
| 2016/0182998 A1 | 6/2016 | Galal et al. |
| 2016/0210111 A1 | 7/2016 | Kraft |
| 2016/0210407 A1 | 7/2016 | Hwang et al. |
| 2016/0217321 A1 | 7/2016 | Gottleib |
| 2016/0217795 A1 | 7/2016 | Lee et al. |
| 2016/0234204 A1 | 8/2016 | Rishi et al. |
| 2016/0248768 A1 | 8/2016 | McLaren et al. |
| 2016/0314790 A1 | 10/2016 | Tsujikawa et al. |
| 2016/0324478 A1 | 11/2016 | Goldstein |
| 2016/0330198 A1 | 11/2016 | Stern et al. |
| 2016/0371555 A1 | 12/2016 | Derakhshani |
| 2016/0372139 A1 | 12/2016 | Cho et al. |
| 2017/0011406 A1 | 1/2017 | Tunnell et al. |
| 2017/0049335 A1 | 2/2017 | Duddy |
| 2017/0068805 A1 | 3/2017 | Chandrasekharan et al. |
| 2017/0078780 A1 | 3/2017 | Qian et al. |
| 2017/0110117 A1 | 4/2017 | Chakladar et al. |
| 2017/0110121 A1 | 4/2017 | Warford et al. |
| 2017/0112671 A1 | 4/2017 | Goldstein |
| 2017/0116995 A1 | 4/2017 | Ady et al. |
| 2017/0134377 A1 | 5/2017 | Tokunaga et al. |
| 2017/0150254 A1 | 5/2017 | Bakish et al. |
| 2017/0161482 A1 | 6/2017 | Eltoft et al. |
| 2017/0162198 A1 | 6/2017 | Chakladar et al. |
| 2017/0169828 A1 | 6/2017 | Sachdev |
| 2017/0200451 A1 | 7/2017 | Bocklet et al. |
| 2017/0213268 A1 | 7/2017 | Puehse et al. |
| 2017/0214687 A1 | 7/2017 | Klein et al. |
| 2017/0231534 A1 | 8/2017 | Agassy et al. |
| 2017/0242990 A1 | 8/2017 | Chien |
| 2017/0256270 A1 | 9/2017 | Singaraju et al. |
| 2017/0279815 A1 | 9/2017 | Chung et al. |
| 2017/0287490 A1 | 10/2017 | Biswal et al. |
| 2017/0293749 A1 | 10/2017 | Baek et al. |
| 2017/0323644 A1 | 11/2017 | Kawato |
| 2017/0347180 A1* | 11/2017 | Petrank .................. G06F 3/165 |
| 2017/0347348 A1 | 11/2017 | Masaki et al. |
| 2017/0351487 A1 | 12/2017 | Vaquero et al. |
| 2017/0373655 A1 | 12/2017 | Mengad et al. |
| 2018/0018974 A1 | 1/2018 | Zass |
| 2018/0032712 A1 | 2/2018 | Oh et al. |
| 2018/0039769 A1 | 2/2018 | Saunders et al. |
| 2018/0047393 A1 | 2/2018 | Tian et al. |
| 2018/0060552 A1 | 3/2018 | Pellom et al. |
| 2018/0060557 A1 | 3/2018 | Valenti et al. |
| 2018/0096120 A1 | 4/2018 | Boesen |
| 2018/0107866 A1 | 4/2018 | Li et al. |
| 2018/0108225 A1 | 4/2018 | Mappus et al. |
| 2018/0113673 A1 | 4/2018 | Sheynblat |
| 2018/0121161 A1 | 5/2018 | Ueno et al. |
| 2018/0146370 A1 | 5/2018 | Krishnaswamy et al. |
| 2018/0166071 A1 | 6/2018 | Lee et al. |
| 2018/0174600 A1 | 6/2018 | Chaudhuri et al. |
| 2018/0176215 A1 | 6/2018 | Perotti et al. |
| 2018/0187969 A1 | 7/2018 | Kim et al. |
| 2018/0191501 A1 | 7/2018 | Lindemann |
| 2018/0197525 A1 | 7/2018 | Kikuhara et al. |
| 2018/0232201 A1 | 8/2018 | Holtmann |
| 2018/0232511 A1 | 8/2018 | Bakish |
| 2018/0233142 A1 | 8/2018 | Koishida et al. |
| 2018/0239955 A1 | 8/2018 | Rodriguez et al. |
| 2018/0240463 A1 | 8/2018 | Perotti |
| 2018/0254046 A1 | 9/2018 | Khoury et al. |
| 2018/0289354 A1 | 10/2018 | Cvijanovic et al. |
| 2018/0292523 A1 | 10/2018 | Orenstein et al. |
| 2018/0308487 A1 | 10/2018 | Goel et al. |
| 2018/0324518 A1 | 11/2018 | Dusan et al. |
| 2018/0330727 A1 | 11/2018 | Tulli |
| 2018/0336716 A1 | 11/2018 | Ramprashad et al. |
| 2018/0336901 A1 | 11/2018 | Masaki et al. |
| 2018/0342237 A1 | 11/2018 | Lee et al. |
| 2018/0349585 A1 | 12/2018 | Ahn et al. |
| 2018/0352332 A1 | 12/2018 | Tao |
| 2018/0358020 A1 | 12/2018 | Chen et al. |
| 2018/0366124 A1 | 12/2018 | Cilingir et al. |
| 2018/0374487 A1 | 12/2018 | Lesso |
| 2018/0376234 A1 | 12/2018 | Petrank |
| 2019/0005963 A1 | 1/2019 | Alonso et al. |
| 2019/0005964 A1 | 1/2019 | Alonso et al. |
| 2019/0013033 A1 | 1/2019 | Bhimanaik et al. |
| 2019/0027152 A1 | 1/2019 | Huang et al. |
| 2019/0030452 A1 | 1/2019 | Fassbender et al. |
| 2019/0042871 A1 | 2/2019 | Pogorelik |
| 2019/0043512 A1 | 2/2019 | Huang et al. |
| 2019/0065478 A1 | 2/2019 | Tsujikawa et al. |
| 2019/0098003 A1 | 3/2019 | Ota |
| 2019/0103115 A1 | 4/2019 | Lesso |
| 2019/0114496 A1 | 4/2019 | Lesso |
| 2019/0114497 A1 | 4/2019 | Lesso |
| 2019/0115030 A1 | 4/2019 | Lesso |
| 2019/0115032 A1 | 4/2019 | Lesso |
| 2019/0115033 A1 | 4/2019 | Lesso |
| 2019/0115046 A1 | 4/2019 | Lesso |
| 2019/0122670 A1 | 4/2019 | Roberts et al. |
| 2019/0147888 A1 | 5/2019 | Lesso |
| 2019/0149920 A1 | 5/2019 | Putzeys et al. |
| 2019/0149932 A1 | 5/2019 | Lesso |
| 2019/0180014 A1 | 6/2019 | Kovvali et al. |
| 2019/0197755 A1 | 6/2019 | Vats |
| 2019/0199935 A1 | 6/2019 | Danielsen et al. |
| 2019/0228778 A1 | 7/2019 | Lesso |
| 2019/0228779 A1 | 7/2019 | Lesso |
| 2019/0246075 A1 | 8/2019 | Khadloya et al. |
| 2019/0260731 A1 | 8/2019 | Chandrasekharan et al. |
| 2019/0287536 A1 | 9/2019 | Sharifi et al. |
| 2019/0294629 A1 | 9/2019 | Wexler et al. |
| 2019/0295554 A1 | 9/2019 | Lesso |
| 2019/0304470 A1 | 10/2019 | Ghaemmaghami et al. |

(56) References Cited

U.S. PATENT DOCUMENTS

| | | | |
|---|---|---|---|
| 2019/0306594 A1 | 10/2019 | Aumer et al. | |
| 2019/0306613 A1 | 10/2019 | Qian et al. | |
| 2019/0311722 A1 | 10/2019 | Caldwell | |
| 2019/0313014 A1 | 10/2019 | Welbourne et al. | |
| 2019/0318035 A1 | 10/2019 | Blanco et al. | |
| 2019/0356588 A1 | 11/2019 | Shahraray et al. | |
| 2019/0371330 A1 | 12/2019 | Lin et al. | |
| 2019/0372969 A1 | 12/2019 | Chang et al. | |
| 2019/0373438 A1 | 12/2019 | Amir et al. | |
| 2019/0392145 A1 | 12/2019 | Komogortsev | |
| 2019/0394195 A1 | 12/2019 | Chari et al. | |
| 2020/0035247 A1 | 1/2020 | Boyadjiev et al. | |
| 2020/0184057 A1* | 6/2020 | Mukund | G06F 21/44 |
| 2020/0204937 A1 | 6/2020 | Lesso | |
| 2020/0227071 A1 | 7/2020 | Lesso | |
| 2020/0265834 A1 | 8/2020 | Lesso et al. | |
| 2020/0286492 A1 | 9/2020 | Lesso | |
| 2021/0043219 A1* | 2/2021 | Goldstein | G06F 3/165 |
| 2021/0303669 A1 | 9/2021 | Lesso | |
| 2022/0382846 A1 | 12/2022 | Koshinaka et al. | |

FOREIGN PATENT DOCUMENTS

| | | |
|---|---|---|
| CN | 1937955 A | 3/2007 |
| CN | 101228787 A | 7/2008 |
| CN | 101578637 A | 11/2009 |
| CN | 102246228 A | 11/2011 |
| CN | 103109495 A | 5/2013 |
| CN | 103477604 A | 12/2013 |
| CN | 104038625 A | 9/2014 |
| CN | 104252860 A | 12/2014 |
| CN | 104956715 A | 9/2015 |
| CN | 105185380 A | 12/2015 |
| CN | 105244031 A | 1/2016 |
| CN | 105702263 A | 6/2016 |
| CN | 105869630 A | 8/2016 |
| CN | 105913855 A | 8/2016 |
| CN | 105933272 A | 9/2016 |
| CN | 105938716 A | 9/2016 |
| CN | 106297772 A | 1/2017 |
| CN | 106531172 A | 3/2017 |
| CN | 106537889 A | 3/2017 |
| CN | 107251573 A | 10/2017 |
| EP | 1205884 A2 | 5/2002 |
| EP | 1600791 A1 | 11/2005 |
| EP | 1701587 A1 | 9/2006 |
| EP | 1928213 A1 | 6/2008 |
| EP | 1965331 A2 | 9/2008 |
| EP | 2660813 A1 | 11/2013 |
| EP | 2704052 A2 | 3/2014 |
| EP | 2860706 A2 | 4/2015 |
| EP | 3016314 A1 | 5/2016 |
| EP | 3156978 A1 | 4/2017 |
| EP | 3466106 A1 | 4/2019 |
| GB | 2375205 A | 11/2002 |
| GB | 2493849 A | 2/2013 |
| GB | 2499781 A | 9/2013 |
| GB | 2515527 A | 12/2014 |
| GB | 2541466 A | 2/2017 |
| GB | 2551209 A | 12/2017 |
| JP | 2003058190 A | 2/2003 |
| JP | 2006010809 A | 1/2006 |
| JP | 2010086328 A | 4/2010 |
| TW | 200820218 A | 5/2008 |
| WO | 9834216 A2 | 8/1998 |
| WO | 0208147 A1 | 10/2002 |
| WO | 02/103680 A2 | 12/2002 |
| WO | 2006054205 A1 | 5/2006 |
| WO | 2007034371 A2 | 3/2007 |
| WO | 2008113024 A1 | 9/2008 |
| WO | 2010066269 A1 | 6/2010 |
| WO | 2013022930 A1 | 2/2013 |
| WO | 2013154790 A1 | 10/2013 |
| WO | 2014040124 A1 | 3/2014 |
| WO | 2015117674 A1 | 8/2015 |
| WO | 2015163774 A1 | 10/2015 |
| WO | 2016003299 A1 | 1/2016 |
| WO | 2017055551 A | 4/2017 |
| WO | 2017203484 A1 | 11/2017 |
| WO | 2019002831 A1 | 1/2019 |
| WO | 2019008387 A1 | 1/2019 |
| WO | 2019008389 A1 | 1/2019 |
| WO | 2019008392 A1 | 1/2019 |

OTHER PUBLICATIONS

Wang, Qian, et al., VoicePop: A Pop Noise based Anti-spoofing System for Voice Authentication on Smartphones, IEEE INFOCOM 2019—IEEE Conference on Computer Communications, Apr. 29-May 2, 2019, pp. 2062-2070.

Examination Report under Section 18(3), UKIPO, Application No. GB1918956.2, mailed Jul. 29, 2021.

Examination Report under Section 18(3), UKIPO, Application No. GB1918965.3, mailed Aug. 2, 2021.

Combined Search and Examination Report under Sections 17 and 18(3), UKIPO, Application No. GB2105613.0, mailed Sep. 27, 2021.

Combined Search and Examination Report under Sections 17 and 18(3), UKIPO, Application No. GB2114337.5, mailed Nov. 3, 2021.

Combined Search and Examination Report under Sections 17 and 18(3), UKIPO, Application No. GB2112228.8, mailed May 17, 2022.

Search Report under Section 17, UKIPO, Application No. GB2202521.7, mailed Jun. 21, 2022.

Combined Search and Examination Report under Sections 17 and 18(3), UKIPO, Application No. GB2210986.2, mailed Nov. 15, 2022.

First Office Action, China National Intellectual Property Administration, Application No. 201800658351, mailed Feb. 4, 2023.

Search Report, China National Intellectual Property Administration, Application No. 201800658351, dated Feb. 2, 2023.

First Office Action, China National Intellectual Property Administration, Application No. 2018800452077, mailed Feb. 25, 2023.

First Office Action, China National Intellectual Property Administration, Application No. 2018800452787, mailed Mar. 14, 2023.

First Office Action, China National Intellectual Property Administration, Patent Application No. 2018800419187, issued Feb. 28, 2023.

Notice of Preliminary Rejection, Korean Intellectual Property Office, Patent Application No. 10-2020-7002065, dated Apr. 17, 2023.

Notice of Preliminary Rejection, Korean Intellectual Property Office, Patent Application No. 10-2020-7002061, dated Apr. 27, 2023.

Wu et al., A study on replay attack and anti-spoofing for text-dependent speaker verification, Signal and Information Processing Association Annual Summit and Conference (APSIPA), 2014 Asia-Pacific, Dec. 9-12, 2014, IEEE.

Jain et al., An Introduction to Biometric Recognition, IEEE Transactions on Circuits and Systems for Video Technology, vol. 14, No. 1, pp. 4-20, Jan. 2004.

Ohtsuka, Takahiro and Kasuya, Hideki, Robust ARX Speech Analysis Method Taking Voice Source Pulse Train Into Account, Journal of the Acoustical Society of Japan, 58, 7, pp. 386-397, 2002.

Wikipedia, Voice (phonetics), https://en.wikipedia.org/wiki/Voice_(phonetics), accessed Jun. 1, 2020.

Zhang et al., DolphinAttack: Inaudible Voice Commands, Retrieved from Proceedings of the 2017 ACM SIGSAC Conference on Computer and Communications Security, Aug. 2017.

Song, Liwei, and Prateek Mittal, Poster: Inaudible Voice Commands, Proceedings of the 2017 ACM SIGSAC Conference on Computer and Communications Security, Aug. 2017.

Fortuna, Andrea, [Online], DolphinAttack: inaudiable voice commands allow attackers to control Siri, Alexa and other digital assistants, Sep. 2017.

First Office Action, China National Intellectual Property Administration, Patent Application No. 2018800418983, Date of Issue May 29, 2020.

International Search Report and Written Opinion, International Application No. PCT/GB2020/050723, mailed Jun. 16, 2020.

(56) References Cited

OTHER PUBLICATIONS

Liu, Yuxi et al., "Earprint: Transient Evoked Otoacoustic Emission for Biometrics", IEEE Transactions on Information Forensics and Security, IEEE, Piscataway, NJ, US, vol. 9, No. 12, Dec. 1, 2014, pp. 2291-2301.
Seha, Sherif Nagib Abbas et al., "Human recognition using transient auditory evoked potentials: a preliminary study", IET Biometrics, IEEE, Michael Faraday House, Six Hills Way, Stevenage, Herts., UK, vol. 7, No. 3, May 1, 2018, pp. 242-250.
Liu, Yuxi et al., "Biometric identification based on Transient Evoked Otoacoustic Emission", IEEE International Symposium on Signal Processing and Information Technology, IEEE, Dec. 12, 2013, pp. 267-271.
Toth, Arthur R., et al., Synthesizing Speech from Doppler Signals, ICASSP 2010, IEEE, pp. 4638-4641.
Boesen, U.S. Appl. No. 62/403,045, filed Sep. 30, 2017.
Meng, Y. et al., "Liveness Detection for Voice User Interface via Wireless Signals in IoT Environment," in IEEE Transactions on Dependable and Secure Computing, doi: 10.1109/TDSC.2020.2973620.
Zhang, L. et al., Hearing Your Voice is Not Enough: An Articulatory Gesture Based Liveness Detection for Voice Authentication, CCS '17: Proceedings of the 2017 ACM SIGSAC Conference on Computer and Communications Security, Oct. 2017 pp. 57-71.
International Search Report and Written Opinion of the International Searching Authority, International Application No. PCT/GB2019/052302, mailed Oct. 2, 2019.
Liu, Yuan et al., "Speaker verification with deep features", Jul. 2014, in International Joint Conference on Neural Networks (IJCNN), pp. 747-753, IEEE.
International Search Report and Written Opinion of the International Searching Authority, International Application No. PCT/GB2018/051927, mailed Sep. 25, 2018.
Combined Search and Examination Report under Sections 17 and 18(3), UKIPO, Application No. 1801530.5, mailed Jul. 25, 2018.
International Search Report and Written Opinion of the International Searching Authority, International Application No. PCT/GB2018/051924, mailed Sep. 26, 2018.
Combined Search and Examination Report under Sections 17 and 18(3), UKIPO, Application No. 1801526.3, mailed Jul. 25, 2018.
International Search Report and Written Opinion of the International Searching Authority, International Application No. PCT/GB2018/051931, mailed Sep. 27, 2018.
Combined Search and Examination Report under Sections 17 and 18(3), UKIPO, Application No. 1801527.1, mailed Jul. 25, 2018.
International Search Report and Written Opinion of the International Searching Authority, International Application No. PCT/GB2018/051925, mailed Sep. 26, 2018.
Combined Search and Examination Report under Sections 17 and 18(3), UKIPO, Application No. 1801528.9, mailed Jul. 25, 2018.
International Search Report and Written Opinion of the International Searching Authority, International Application No. PCT/GB2018/051928, mailed Dec. 3, 2018.
Combined Search and Examination Report under Sections 17 and 18(3), UKIPO, Application No. 1801532.1, mailed Jul. 25, 2018.
Lim, Zhi Hao et al., An Investigation of Spectral Feature Partitioning for Replay Attacks Detection, Proceedings of APSIPA Annual Summit and Conference 2017, Dec. 12-15, 2017, Malaysia, pp. 1570-1573.
International Search Report and Written Opinion of the International Searching Authority, International Application No. PCT/GB2018/053274, mailed Jan. 24, 2019.
Beigi, Homayoon, "Fundamentals of Speaker Recognition," Chapters 8-10, ISBN: 978-0-378-77592-0; 2011.
Li, Lantian et al., "A Study on Replay Attack and Anti-Spoofing for Automatic Speaker Verification", Interspeech 2017, Jan. 1, 2017, pp. 92-96.
Li, Zhi et al., "Compensation of Hysteresis Nonlinearity in Magnetostrictive Actuators with Inverse Multiplicative Structure for Preisach Model", IEE Transactions on Automation Science and Engineering, vol. 11, No. 2, Apr. 1, 2014, pp. 613-619.
Partial International Search Report of the International Searching Authority, International Application No. PCT/GB2018/052905, mailed Jan. 25, 2019.
Further Search Report under Sections 17 (6), UKIPO, Application No. GB1719731.0, mailed Nov. 26, 2018.
Combined Search and Examination Report, UKIPO, Application No. GB1713695.3, mailed Feb. 19, 2018.
Zhang et al., An Investigation of Deep-Learing Frameworks for Speaker Verification Antispoofing—IEEE Journal of Selected Topics in Signal Processes, Jun. 1, 2017.
Combined Search and Examination Report under Sections 17 and 18(3), UKIPO, Application No. GB1804843.9, mailed Sep. 27, 2018.
Wu et al., Anti-Spoofing for text-Independent Speaker Verification: An Initial Database, Comparison of Countermeasures, and Human Performance, IEEE/ACM Transactions on Audio, Speech, and Language Processing, Issue Date: Apr. 2016.
Combined Search and Examination Report under Sections 17 and 18(3), UKIPO, Application No. GB1803570.9, mailed Aug. 21, 2018.
Combined Search and Examination Report under Sections 17 and 18(3), UKIPO, Application No. GB1801661.8, mailed Jul. 30, 2018.
Combined Search and Examination Report under Sections 17 and 18(3), UKIPO, Application No. GB1801663.4, mailed Jul. 18, 2018.
Combined Search and Examination Report under Sections 17 and 18(3), UKIPO, Application No. GB1801664.2, mailed Aug. 1, 2018.
Combined Search and Examination Report under Sections 17 and 18(3), UKIPO, Application No. GB1719731.0, mailed May 16, 2018.
Combined Search and Examination Report, UKIPO, Application No. GB1801874.7, mailed Jul. 25, 2018.
Combined Search and Examination Report under Sections 17 and 18(3), UKIPO, Application No. GB1801659.2, mailed Jul. 26, 2018.
International Search Report and Written Opinion of the International Searching Authority, International Application No. PCT/GB2018/052906, mailed Jan. 14, 2019.
International Search Report and Written Opinion of the International Searching Authority, International Application No. PCT/GB2019/050185, mailed Apr. 2, 2019.
Combined Search and Examination Report under Sections 17 and 18(3), UKIPO, Application No. GB1809474.8, mailed Jul. 23, 2018.
Ajmera, et al,, "Robust Speaker Change Detection," IEEE Signal Processing Letters, vol. 11, No. 8, pp. 649-651, Aug. 2004.
International Search Report and Written Opinion of the International Searching Authority, International Application No. PCT/GB2018/051760, mailed Aug. 3, 2018.
International Search Report and Written Opinion of the International Searching Authority, International Application No. PCT/GB2018/051787, mailed Aug. 16, 2018.
Villalba, Jesus et al., Preventing Replay Attacks on Speaker Verification Systems, International Carnahan Conference On Security Technology (ICCST), 2011 IEEE, Oct. 18, 2011, pp. 1-8.
International Search Report and Written Opinion of the International Searching Authority, International Application No. PCT/GB2018/051765, mailed Aug. 16, 2018.
Combined Search and Examination Report under Sections 17 and 18(3), UKIPO, Application No. GB1713697.9, mailed Feb. 20, 2018.
Chen et al., "You Can Hear But You Cannot Steal: Defending Against Voice Impersonation Attacks on Smartphones", Proceedings of the International Conference on Distributed Computing Systems, PD: 20170605.
International Search Report and Written Opinion of the International Searching Authority, International Application No. PCT/GB2018/052907, mailed Jan. 15, 2019.
Combined Search and Examination Report under Sections 17 and 18(3), UKIPO, Application No. GB1713699.5, mailed Feb. 21, 2018.
International Search Report and Written Opinion of the International Searching Authority, International Application No. PCT/GB2019/052143, mailed Sep. 17, 2019.

(56) References Cited

OTHER PUBLICATIONS

Lucas, Jim, What Is Electromagnetic Radiation? Live Science, Mar. 13, 2015, NY, NY.
Brownlee, Jason, A Gentle Introduction to Autocorrelation and Partial Autocorrelation, Feb. 6, 2017, https://machinelearningmastery.com/gentle-introduction-autocorrelation-partial-autocorrelation/, accessed Apr. 28, 2020.

* cited by examiner

METHODS, APPARATUS AND SYSTEMS FOR AUDIO PLAYBACK

The present application is a continuation of U.S. Non-Provisional application Ser. No. 18/101,843, filed Jan. 26, 2023, which is a divisional of U.S. Non-Provisional application Ser. No. 17/034,816, filed Sep. 28, 2020, which is a divisional of U.S. Non-Provisional application Ser. No. 16/028,824, filed Jul. 6, 2018, which claims priority to United Kingdom Patent Application No. 1801532.1, filed Jan. 30, 2018, and U.S. Provisional Patent Application Ser. No. 62/529,697, filed Jul. 7, 2017, each of which is incorporated by reference herein in its entirety.

TECHNICAL FIELD

Embodiments of the disclosure relate to methods, apparatus and systems for audio playback, and particularly to methods, apparatus and systems for audio playback via a personal audio device following a biometric process.

BACKGROUND

It is known that the acoustic properties of a user's ear, whether the outer parts (known as the pinna or auricle), the ear canal or both, differ substantially between individuals and can therefore be used as a biometric to identify the user. One or more loudspeakers or similar transducers positioned close to or within the ear generate an acoustic stimulus, and one or more microphones similarly positioned close to or within the ear detect the acoustic response of the ear to the acoustic stimulus. One or more features may be extracted from the response signal, and used to characterize an individual.

For example, the ear canal is a resonant system, and therefore one feature which may be extracted from the response signal is the resonant frequency of the ear canal. If the measured resonant frequency (i.e. in the response signal) differs from a stored resonant frequency for the user, a biometric algorithm coupled to receive and analyse the response signal may return a negative result. Other features of the response signal may be similarly extracted and used to characterize the individual. For example, the features may comprise one or more mel frequency cepstrum coefficients. More generally, the transfer function between the acoustic stimulus and the measured response signal (or features of the transfer function) may be determined, and compared to a stored transfer function (or stored features of the transfer function) which is characteristic of the user.

SUMMARY

Ear biometric authentication has some useful properties. For example, conventional biometric authentication, such as through detection and verification of a person's voice or fingerprint, may inform an electronic device as to the person who requested authentication; however, it may provide no information as to who continues to use the device after authentication. Fingerprint authentication will provide no further information once the user's finger is removed from the fingerprint sensor. Voice biometric authentication, even if continually active, will provide no information unless the user is actually speaking. Ear biometric authentication, uniquely, informs an electronic device as to who is listening to audio playback from the electronic device.

Accordingly, embodiments of the present disclosure utilize this concept to implement one or more audio playback settings which are specific to an authorised user, subsequent to successful authentication of a user as that authorised user. Thus, a personal audio device (such as those described above with respect to FIGS. 1a to 1e) may be utilized to obtain ear model data for use in authenticating a user via the ear biometric authentication system (as well as potentially other authentication mechanisms, see below). Owing to that successful authentication, the electronic device is informed of the person who is listening to audio playback from the device. Thus the device can implement one or more playback settings which are specific to that authorised user (e.g. secure messages played back audibly over the personal audio device; EQ settings specific to the authorised user, etc).

According to further embodiments, the user-specific playback settings may be further implemented subject to a determination that the personal audio device remains applied to the user's ear following the successful authentication. If it is detected that the personal audio device has been removed from the user's ear since authentication, the user-specific playback settings may be disapplied, and/or one or more default playback settings applied instead.

One aspect of the disclosure provides a method in an electronic system. The electronic system comprises a personal audio device for playback into a user's ear, and an authentication system for authentication of the user, using the personal audio device, based on a measured response of the user's ear to an acoustic stimulus. The method comprises: subsequent to successful authentication of the user with the authentication system based on the measured response, implementing one or more playback settings, specific to the authenticated user, for playback to the authenticated user via the personal audio device.

Another aspect provides a method in an electronic system. The electronic system comprises a personal audio device for playback into a user's ear, and an authentication system for authentication of the user, using the personal audio device, based on a measured response of the user's ear to an acoustic stimulus. The method comprises, using the authentication system, authenticating the user as an authorised user based on the measured response of the user's ear; and, based on the authentication of the user, implementing one or more playback settings, specific to the authorised user, for playback to the user via the personal audio device.

A further aspect provides a method in an electronic system. The electronic system comprises a personal audio device for playback into a user's ear, and an authentication system for authentication of the user, using the personal audio device, based on a measured response of the user's ear to an acoustic stimulus. The method comprises: responsive to detection of an event requiring audio playback, using the authentication system, authenticating the user as an authorised user based on the measured response of the user's ear; and, based on the authentication of the user, implementing one or more playback settings, specific to the authorised user, for the audio playback to the user via the personal audio device.

Yet another aspect provides a method in an electronic system. The electronic system comprises a personal audio device for playback into a user's ear, and an authentication system for authentication of the user, using the personal audio device, based on a measured response of the user's ear to an acoustic stimulus. The method comprises: using the authentication system, authenticating the user as an authorised user based on the measured response of the user's ear; and, upon detection of an event requiring audio playback, responsive to a determination that the personal audio device has been continuously worn by the user since the authentication, implementing one or more playback settings, specific to the authorised user, for the audio playback to the user via the personal audio device.

Another aspect provides a method for controlling playback settings in an electronic system. The electronic system comprises a personal audio device for playback into a user's ear. The method comprises: applying an acoustic stimulus to the user's ear; measuring the acoustic response of the user's ear to the acoustic stimulus; attempting an authentication of the user based on the measured acoustic response; and, if the authentication is successful, implementing one or more playback settings, specific to the authenticated user, to control playback to the user via the personal audio device.

A further aspect provides a method for controlling playback into a user's ear from an electronic system. The method comprises: application of one or more playback settings, specific to a particular user, wherein the application of the settings is conditional on a successful authentication of the user as the particular user based on a measured acoustic response of the user's ear to an acoustic stimulus.

Another aspect of the disclosure provides a method in an electronic system. The electronic system comprises a personal audio device for playback of audio signals to a user. The personal audio device comprises first and second loudspeakers for separate playback of audio signals to each of the user's ears, wherein the audio signals comprise a left channel for playback to the user's left ear and a right channel for playback to the user's right ear. The method comprises: generating an acoustic stimulus using the first loudspeaker; measuring a response of one of the user's ears to the acoustic stimulus; identifying the one of the user's ears as the user's left or right ear; and outputting the left or right channel to the first loudspeaker in accordance with the identification of the one of the user's ears.

Further aspects provide apparatus and computer-readable media for performing any of the methods set out above. For example, in one aspect, an electronic apparatus comprising processing circuitry and a non-transitory machine-readable medium storing instructions which, when executed by the processing circuitry, cause the electronic apparatus to implement any of the methods set out above. Another aspect provides a non-transitory machine-readable medium storing instructions which, when executed by processing circuitry of an electronic apparatus, cause the electronic apparatus to implement any of the methods set out above.

In one particular aspect, an apparatus for providing audio playback to a user comprises: an ear biometric module configured to obtain ear biometric data for the user, and attempt an authentication of the user based on the ear biometric data; and a control module configured to implement, if the authentication is successful, one or more playback settings, specific to the authenticated user, to control audio playback to the user via a personal audio device.

A further aspect provides an apparatus for providing audio playback to a user. The apparatus comprises: an ear biometric module configured to obtain ear biometric data for the user, and authenticating the user based on the ear biometric data; and a control module configured to, subsequent to successful authentication of the user with the ear biometric module, implement one or more playback settings, specific to the authenticated user, for playback to the authenticated user.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

As noted above, ear biometric data may be acquired by the generation of an acoustic stimulus, and the detection of an acoustic response of the ear to the acoustic stimulus. One or more features may be extracted from the response signal, and used to characterize the individual.

The acoustic stimulus may be generated and the response measured using a personal audio device. As used herein, the term "personal audio device" is any electronic device which is suitable for, or configurable to, provide audio playback substantially to only a single user. Some examples of suitable personal audio devices are shown in FIGS. 1a to 1e.

Figure 1A:
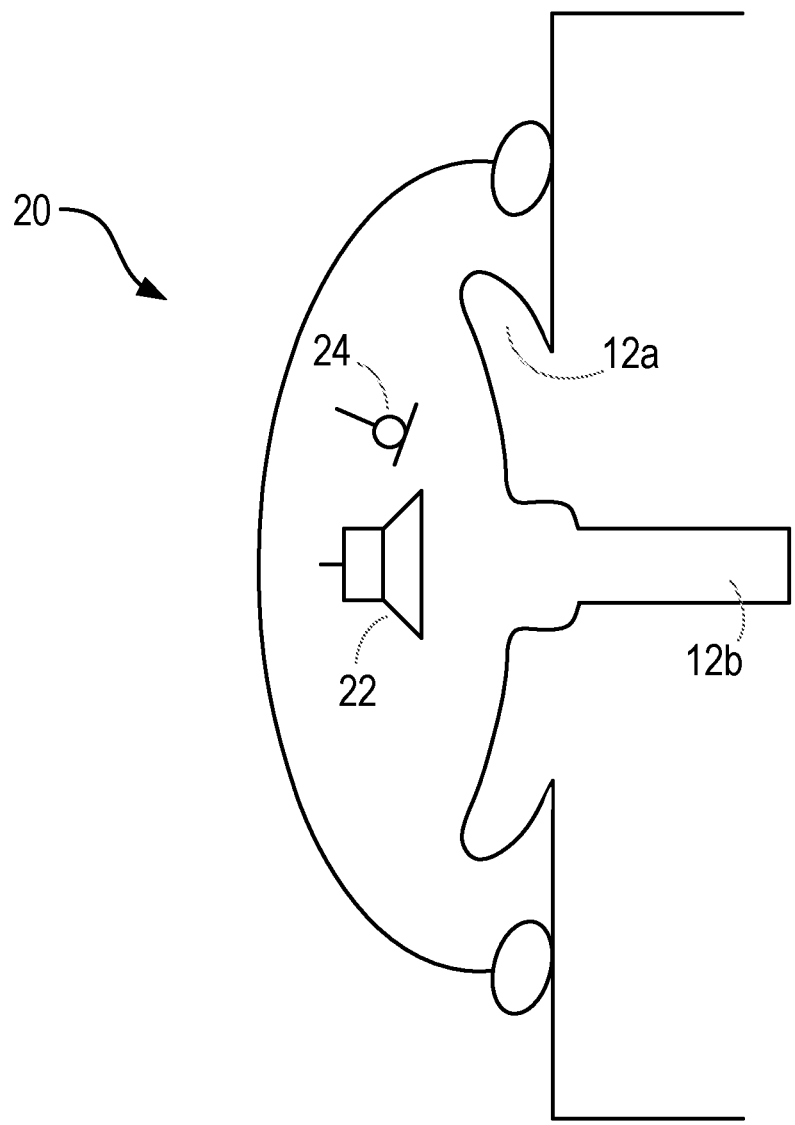
FIGS. 1a to 1e show examples of personal audio devices.

FIG. 1a shows a schematic diagram of a user's ear, comprising the (external) pinna or auricle 12a, and the (internal) ear canal 12b. A personal audio device 20 comprising a circum-aural headphone is worn by the user over the ear. The headphone comprises a shell which substantially surrounds and encloses the auricle, so as to provide a physical barrier between the user's ear and the external environment. Cushioning or padding may be provided at an edge of the shell, so as to increase the comfort of the user, and also the acoustic coupling between the headphone and the user's skin (i.e. to provide a more effective barrier between the external environment and the user's ear).

The headphone comprises one or more loudspeakers 22 positioned on an internal surface of the headphone, and arranged to generate acoustic signals towards the user's ear and particularly the ear canal 12b. The headphone further comprises one or more microphones 24, also positioned on the internal surface of the headphone, arranged to detect acoustic signals within the internal volume defined by the headphone, the auricle 12a and the ear canal 12b.

The headphone may be able to perform active noise cancellation, to reduce the amount of noise experienced by the user of the headphone. Active noise cancellation operates by detecting a noise (i.e. with a microphone), and generating a signal (i.e. with a loudspeaker) that has the same amplitude as the noise signal but is opposite in phase. The generated signal thus interferes destructively with the noise and so lessens the noise experienced by the user. Active noise cancellation may operate on the basis of feedback signals, feedforward signals, or a combination of both. Feedforward active noise cancellation utilizes one or more microphones on an external surface of the headphone, operative to detect the environmental noise before it reaches the user's ear. The detected noise is processed quickly, and the cancellation signal generated so as to match the incoming noise as it arrives at the user's ear. Feedback active noise cancellation utilizes one or more error microphones positioned on the internal surface of the headphone, operative to detect the combination of the noise and the audio playback signal generated by the one or more loudspeakers. This combination is used in a feedback loop, together with knowledge of the audio playback signal, to adjust the cancelling signal generated by the loudspeaker and so reduce the noise. The microphone 24 shown in FIG. 1*a* may therefore form part of an active noise cancellation system, for example, as an error microphone.

Figure 1B:
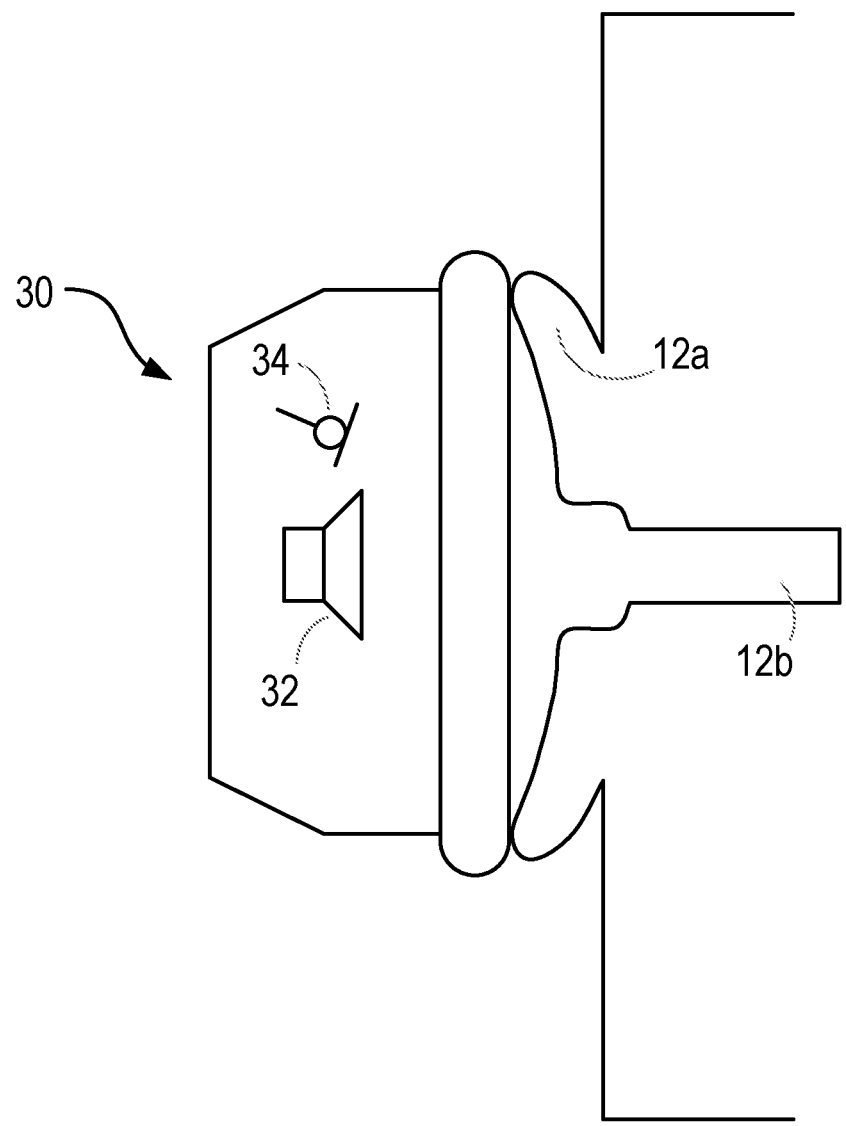

FIG. 1*b* shows an alternative personal audio device 30, comprising a supra-aural headphone. The supra-aural headphone does not surround or enclose the user's ear, but rather sits on the auricle 12*a*. The headphone may comprise a cushion or padding to lessen the impact of environmental noise. As with the circum-aural headphone shown in FIG. 1*a*, the supra-aural headphone comprises one or more loudspeakers 32 and one or more microphones 34. The loudspeaker(s) 32 and the microphone(s) 34 may form part of an active noise cancellation system, with the microphone 34 serving as an error microphone.

Figure 1C:
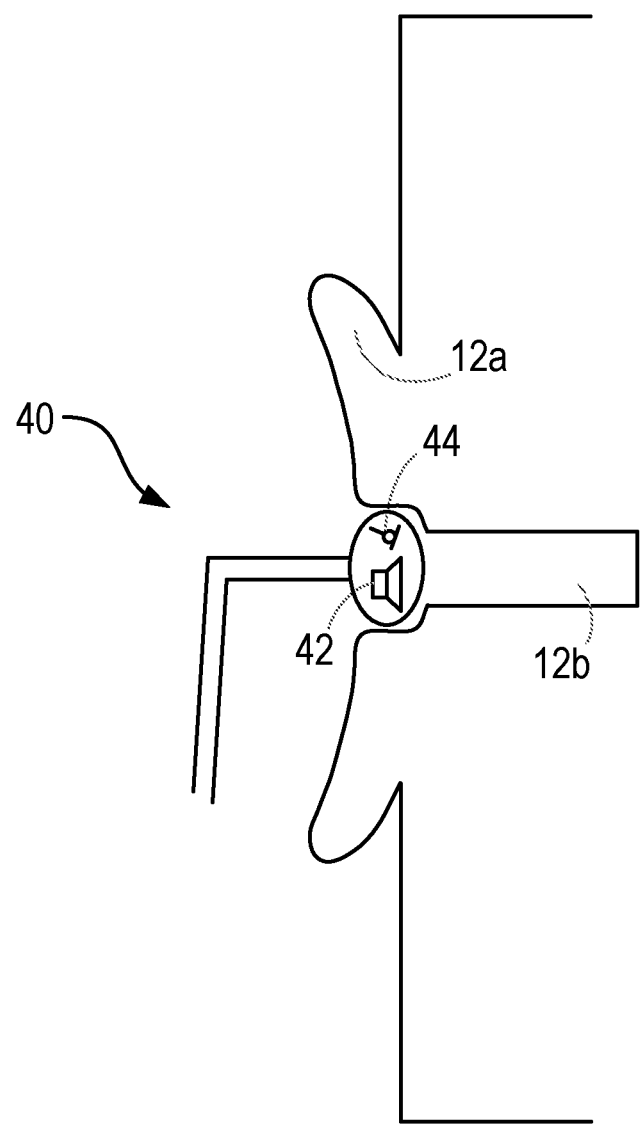

FIG. 1*c* shows a further alternative personal audio device 40, comprising an intra-concha headphone (or earphone). In use, the intra-concha headphone sits inside the user's concha cavity. The intra-concha headphone may fit loosely within the cavity, allowing the flow of air into and out of the user's ear canal 12*b*.

As with the devices shown in FIGS. 1*a* and 1*b*, the intra-concha headphone comprises one or more loudspeakers 42 and one or more microphones 44, which may form part of an active noise cancellation system.

Figure 1D:
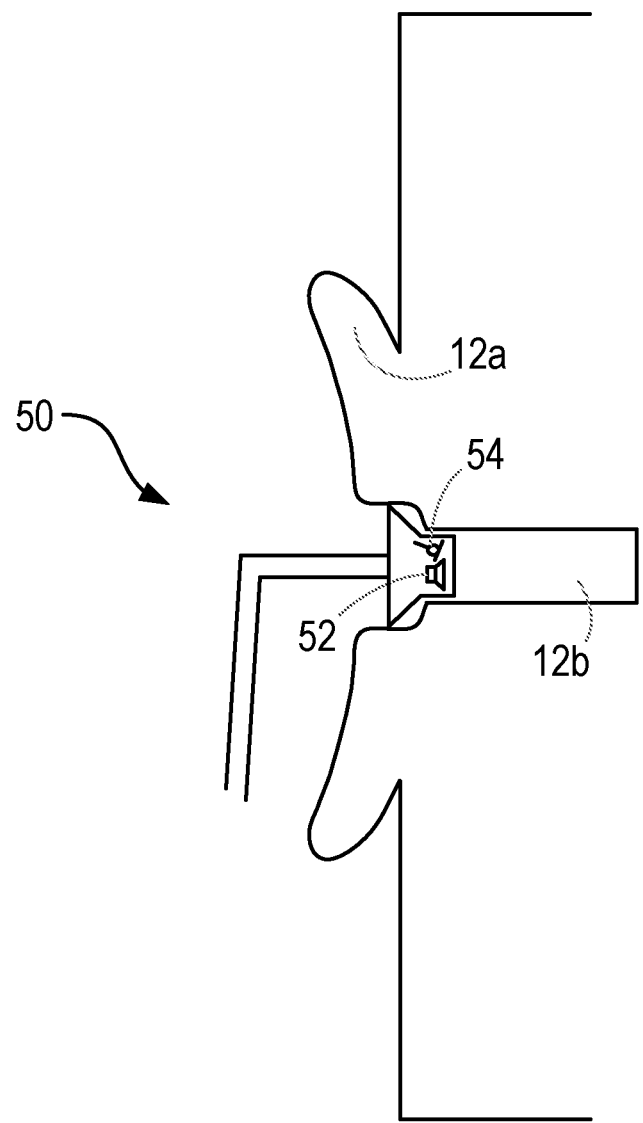

FIG. 1*d* shows a further alternative personal audio device 50, comprising an in-ear headphone (or earphone), insert headphone, or ear bud. This headphone is configured to be partially or totally inserted within the ear canal 12*b*, and may provide a relatively tight seal between the ear canal 12*b* and the external environment (i.e. it may be acoustically closed or sealed). The headphone may comprise one or more loudspeakers 52 and one or more microphones 54, as with the other devices described above, and these components may form part of an active noise cancellation system.

As the in-ear headphone may provide a relatively tight acoustic seal around the ear canal 12*b*, external noise (i.e. coming from the environment outside) detected by the microphone 54 is likely to be low.

Figure 1E:
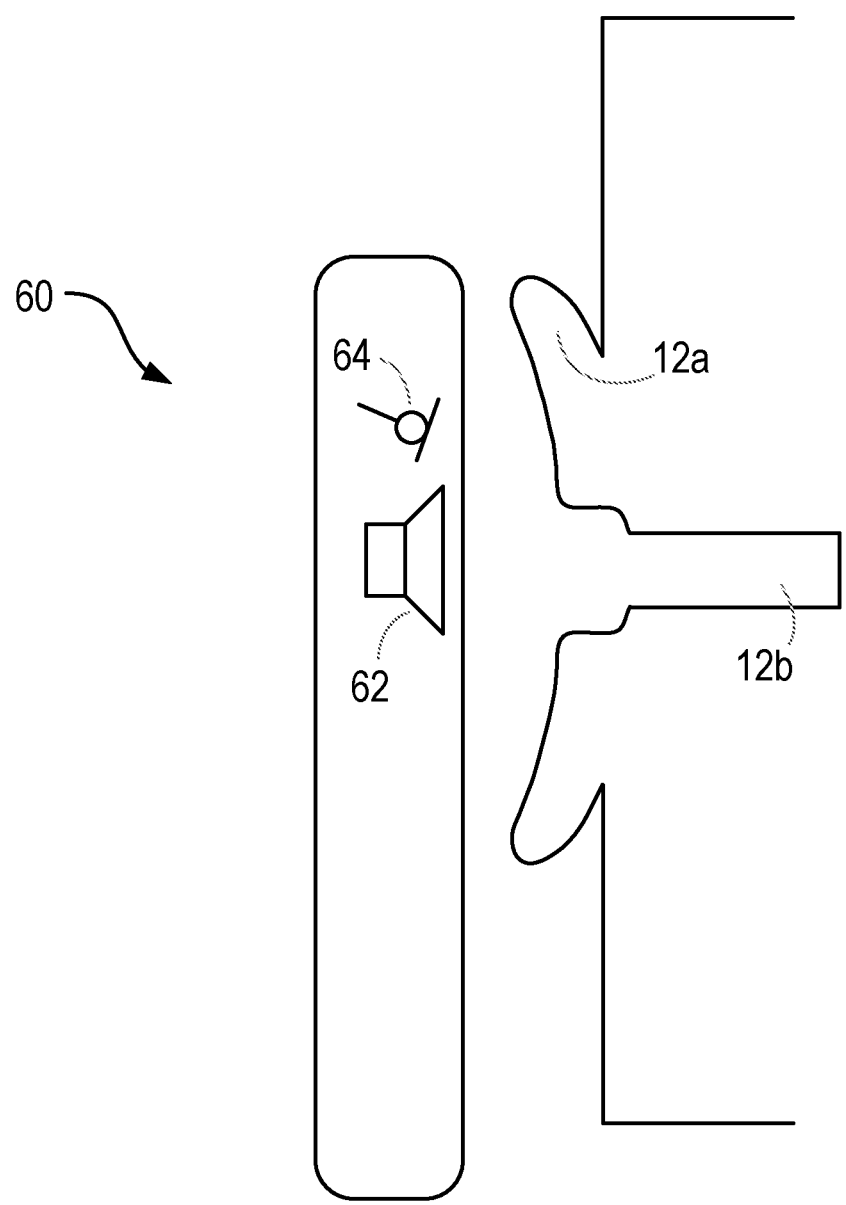

FIG. 1*e* shows a further alternative personal audio device 60, which is a mobile or cellular phone or handset. The handset 60 comprises one or more loudspeakers 62 for audio playback to the user, and one or more microphones 64 which are similarly positioned.

In use, the handset 60 is held close to the user's ear so as to provide audio playback (e.g. during a call). While a tight acoustic seal is not achieved between the handset 60 and the user's ear, the handset 60 is typically held close enough that an acoustic stimulus applied to the ear via the one or more loudspeakers 62 generates a response from the ear which can be detected by the one or more microphones 64. As with the other devices, the loudspeaker(s) 62 and microphone(s) 64 may form part of an active noise cancellation system.

All of the personal audio devices described above thus provide audio playback to substantially a single user in use. Each device comprises one or more loudspeakers and one or more microphones, which may be utilized to generate biometric data related to the frequency response of the user's ear. The loudspeaker is operable to generate an acoustic stimulus, or acoustic probing wave, towards the user's ear, and the microphone is operable to detect and measure a response of the user's ear to the acoustic stimulus, e.g. to measure acoustic waves reflected from the ear canal or the pinna. The acoustic stimulus may be sonic (for example in the audio frequency range of say 20 Hz to 20 kHz) or ultra-sonic (for example greater than 20 kHz or in the range 20 kHz to 50 kHz) or near-ultrasonic (for example in the range 15 kHz to 25 kHz) in frequency. In some examples the microphone signal may be processed to measure received signals of the same frequency as that transmitted.

Another biometric marker may comprise otoacoustic noises emitted by the cochlear in response to the acoustic stimulus waveform. The otoacoustic response may comprise a mix of the frequencies in the input waveform. For example if the input acoustic stimulus consists of two tones at frequencies f1 and f2, the otoacoustic emission may include a component at frequency 2*f1−f2. The relative power of frequency components of the emitted waveform has been shown to be a useful biometric indicator. In some examples therefore the acoustic stimulus may comprise tones of two or more frequencies and the amplitude of mixing products at sums or differences of integer-multiple frequencies generated by otoacoustic emissions from the cochlear may be measured. Alternatively, otoacoustic emissions may be stimulated and measured by using stimulus waveforms comprising fast transients, e.g. clicks.

Depending on the construction and usage of the personal audio device, the measured response may comprise user-specific components, i.e. biometric data relating to the auricle 12*a*, the ear canal 12*b*, or a combination of both the auricle 12*a* and the ear canal 12*b*. For example, the circum-aural headphones shown in FIG. 1*a* will generally acquire data relating to the auricle 12*a* and potentially also the ear canal 12*b*. The insert headphones shown in FIG. 1*d* will generally acquire data relating only to the ear canal 12*b*.

One or more of the personal audio devices described above (or rather, the microphones within those devices) may be operable to detect bone-conducted voice signals from the user. That is, as the user speaks, sound is projected away from the user's mouth through the air. However, acoustic vibrations will also be carried through part of the user's skeleton or skull, such as the jaw bone. These acoustic vibrations may be coupled to the ear canal 12*b* through the jaw or some other part of the user's skeleton or skull, and detected by the microphone. Lower frequency sounds tend to experience a stronger coupling than higher frequency sounds, and voiced speech (i.e. that speech or those phonemes generated while the vocal cords are vibrating) is coupled more strongly via bone conduction than unvoiced speech (i.e. that speech or those phonemes generated while the vocal cords are not vibrating). The in-ear headphone 50 may be particularly suited to detecting bone-conducted speech owing to the tight acoustic coupling around the ear canal 12*b*.

All of the devices shown in FIGS. 1*a* to 1*e* and described above may be used to implement aspects of the disclosure.

Figure 2:
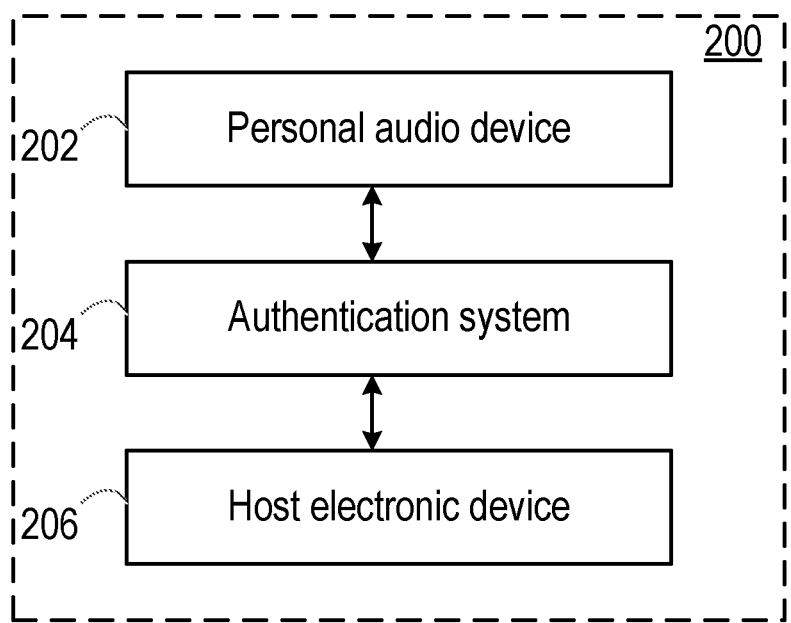
FIG. 2 shows an arrangement according to embodiments of the disclosure.

FIG. 2 shows an arrangement 200 according to embodiments of the disclosure. The arrangement 200 comprises a personal audio device 202, a biometric authentication system 204 and a host electronic device 206.

The personal audio device 202 may be any device which is suitable for, or configurable to provide audio playback to substantially a single user. The personal audio device 202 generally comprises one or more loudspeakers, and one or more microphones which, in use, are positioned adjacent to or within a user's ear. The personal audio device may be wearable, and comprise headphones for each of the user's ears. Alternatively, the personal audio device may be operable to be carried by the user, and held adjacent to the user's ear or ears during use. The personal audio device may comprise headphones or a mobile phone handset, as described above with respect to any of FIGS. 1*a* to 1*e*.

The host electronic device 206 may comprise any suitable audio playback device, configurable to generate audio playback signals to be played to the user via the personal audio device 202. It will be understood that, where the personal audio device 202 comprises a cellular phone or similar device for example, the host device 206 and the personal audio device 202 may be the same.

The biometric system 204 is coupled to both the personal audio device 202 and the host electronic device 206. In some embodiments, the biometric system 204 is provided in the personal audio device 202 itself. In other embodiments, the biometric system 204 is provided in the host electronic device 206. In still further embodiments, operations of the biometric device 204 are distributed between the personal audio device 202 and the host electronic device 206.

The biometric system 204 is coupled to the personal audio device 202 and operative to control the personal audio device 202 to acquire biometric data which is indicative of the individual using the personal audio device 202.

The personal audio device 202 thus generates an acoustic stimulus for application to the user's ear, and detects or measures the response of the ear to the acoustic stimulus. For example, the acoustic stimulus may be in the sonic range, or ultra-sonic. In some embodiments, the acoustic stimulus may have a flat frequency spectrum over a relevant frequency range, or be preprocessed in such a way that those frequencies that allow for a good discrimination between individuals are emphasized (i.e. have a higher amplitude than other frequencies). The measured response corresponds to the reflected signal received at the one or more microphones, with certain frequencies being reflected at higher amplitudes than other frequencies owing to the particular response of the user's ear.

The biometric system 204 may send suitable control signals to the personal audio device 202, so as to initiate the acquisition of biometric data, and receive data from the personal audio device 202 corresponding to the measured response. The biometric system 204 is operable to extract one or more features from the measured response and utilize those features as part of a biometric process.

Some examples of suitable biometric processes include biometric enrolment and biometric authentication. Enrolment comprises the acquisition and storage of biometric data which is characteristic of an individual. In the present context, such stored data may be known as an "ear print". Authentication (alternatively referred to as verification or identification) comprises the acquisition of biometric data from an individual, and the comparison of that data to the stored ear prints of one or more enrolled or authorised users. A positive comparison (i.e. a determination that the acquired data matches or is sufficiently close to a stored ear print) results in the individual being authenticated. For example, the individual may be permitted to carry out a restricted action, or granted access to a restricted area or device. A negative comparison (i.e. a determination that the acquired data does not match or is not sufficiently close to a stored ear print) results in the individual not being authenticated. For example, the individual may not be permitted to carry out the restricted action, or granted access to the restricted area or device.

Thus the biometric system 204 provides an authentication result to the host electronic device 206 which, if the biometric result is positive and identifies the user as an authorised user, is then configured to implement one or more audio playback settings which are specific to the identified authorised user, for playback to the user via the personal audio device 202.

Figure 3:
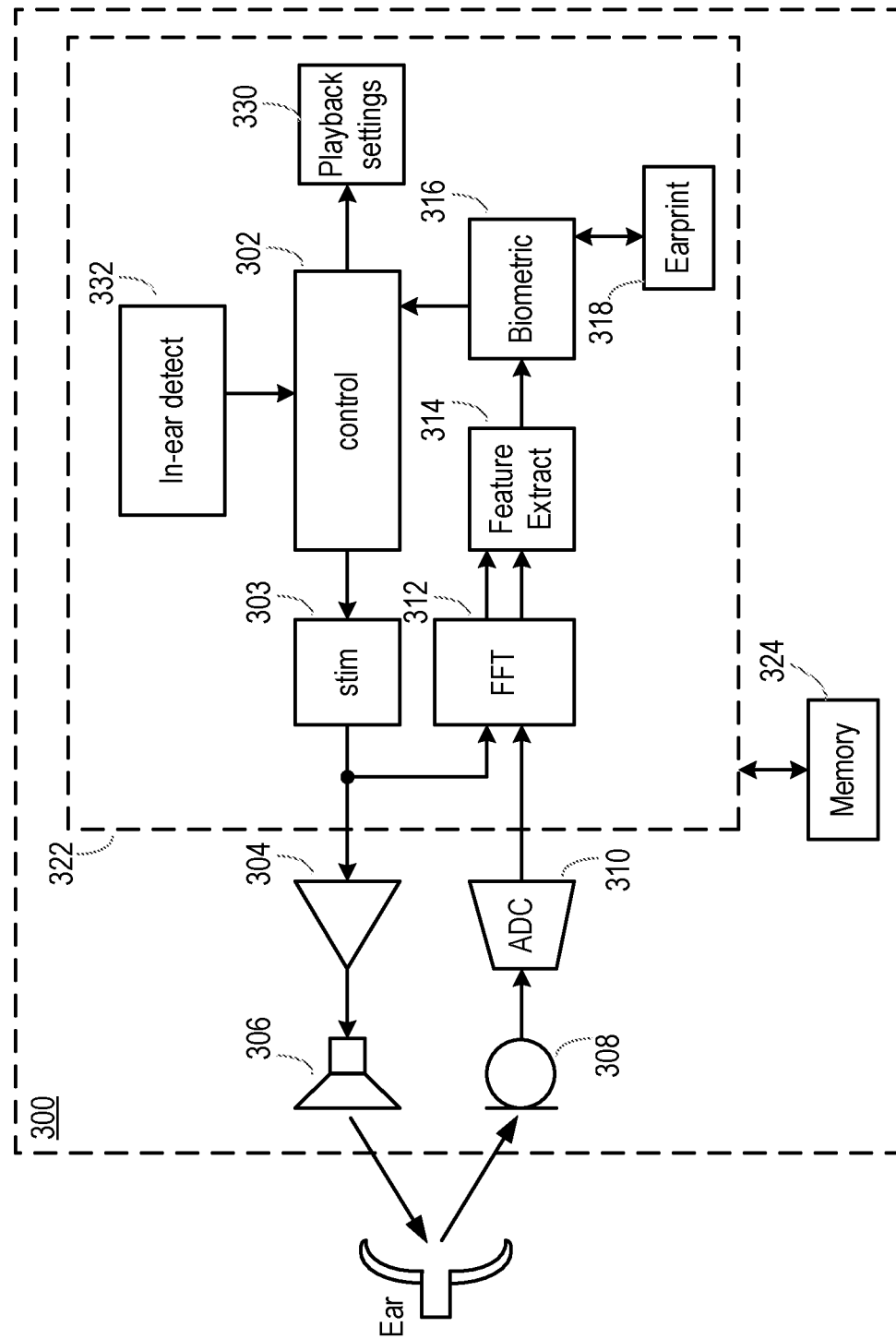
FIG. 3 shows a system according to embodiments of the disclosure.

FIG. 3 shows a system 300 according to embodiments of the disclosure.

The system 300 comprises processing circuitry 322, which may comprise one or more processors, such as a central processing unit or an applications processor (AP), or a digital signal processor (DSP).

The one or more processors may perform methods as described herein on the basis of data and program instructions stored in memory 324. Memory 324 may be provided as a single component or as multiple components or co-integrated with at least some of processing circuitry 322. Specifically, the methods described herein can be performed in processing circuitry 322 by executing instructions that are stored in non-transient form in the memory 324, with the program instructions being stored either during manufacture of the system 300 or personal audio device 202 or by upload while the system or device is in use.

The processing circuitry 322 comprises a stimulus generator module 303 which is coupled directly or indirectly to an amplifier 304, which in turn is coupled to a loudspeaker 306.

The stimulus generator module 303 generates an electrical audio signal and provides the electrical audio signal to the amplifier 304, which amplifies it and provides the amplified signal to the loudspeaker 306. The loudspeaker 306 generates a corresponding acoustic signal which is output to the user's ear (or ears). The audio signal may be sonic or ultra-sonic, for example. The audio signal may have a flat frequency spectrum, or be preprocessed in such a way that those frequencies that allow for a good discrimination between individuals are emphasized (i.e. have a higher amplitude than other frequencies).

As noted above, the audio signal may be output to all or a part of the user's ear (i.e. the auricle 12a or the ear canal 12b). The audio signal is reflected off the ear, and the reflected signal (or echo signal) is detected and received by a microphone 308. The reflected signal thus comprises data which is characteristic of the individual's ear, and suitable for use as a biometric.

The reflected signal is passed from the microphone 308 to an analogue-to-digital converter (ADC) 310, where it is converted from the analogue domain to the digital domain. Of course, in alternative embodiments the microphone 308 may be a digital microphone and produce a digital data signal (which does not therefore require conversion to the digital domain).

The signal is detected by the microphone 308 in the time domain. However, the features extracted for the purposes of the biometric process may be in the frequency domain (in that it is the frequency response of the user's ear which is characteristic). The system 300 therefore comprises a Fourier transform module 312, which converts the reflected signal to the frequency domain. For example, the Fourier transform module 312 may implement a Fast Fourier transform (FFT).

The transformed signal is then passed to a feature extract module 314, which extracts one or more features of the transformed signal for use in a biometric process (e.g. biometric enrolment, biometric authentication, etc). For example, the feature extract module 314 may extract the resonant frequency of the user's ear. For example, the feature extract module 314 may extract one or more mel frequency cepstrum coefficients. Alternatively, the feature extract module may determine the frequency response of the user's ear at one or more predetermined frequencies, or across one or more ranges of frequencies.

The extracted feature(s) are passed to a biometric module 316, which performs a biometric process on them. For example, the biometric module 316 may perform a biometric enrolment, in which the extracted features (or parameters derived therefrom) are stored as part of biometric data 318 which is characteristic of the individual. The biometric data 318 may be stored within the system 300 or remote from the system 300 (and accessible securely by the biometric module 316). Such stored data 318 may be known as an "ear print". In another example, the biometric module 316 may perform a biometric authentication, and compare the one or more extracted features to corresponding features in the stored ear print 318 (or multiple stored ear prints).

The biometric module 316 may then generate a biometric result (i.e. successful or unsuccessful authentication) and output the result to the control module 302.

In some embodiments the stimulus waveforms may be tones of predetermined frequency and amplitude. In other embodiments the stimulus generator may be configurable to apply music to the loudspeaker, e.g. normal playback operation, and the feature extract module may be configurable to extract the response or transfer function from whatever signal components the stimulus waveform contains.

Thus in some embodiments the feature extract module may be designed with foreknowledge of the nature of the stimulus, for example knowing the spectrum of the applied stimulus signal, so that the response or transfer function may be appropriately normalised. In other embodiments the feature extract module may comprise a second input to monitor the stimulus (e.g. playback music) and hence provide the feature extract module with information about the stimulus signal or its spectrum so that the feature extract module may calculate the transfer function from the stimulus waveform stimulus to received acoustic waveform from which it may derive the desired feature parameters. In the latter case, the stimulus signal may also pass to the feature extract module via the FFT module.

On the basis of the authentication result, the control module 302 may implement one or more user-specific playback settings, accessible from a storage module 330 comprising one or a plurality of such playback settings. For example, the storage module 330 may comprise respective audio playback settings for each of the one or more users authorised with the system. The storage module 330 may further comprise one or more default playback settings, for use when a user has not been successfully authenticated.

The system 300 may further comprise a detect module 332, configured to detect whether the personal audio device (i.e. at least the speaker 306 and the microphone 308) are being actively worn by the user, and to provide an output to the processing circuitry 322 indicating the present status of the personal audio device (e.g. worn or not worn). Various mechanisms are suitable for such a purpose. For example, the signal detected by the microphone 308 may be analysed to determine whether it is characteristic of a small volume (i.e. the volume inside the ear canal and/or within a headphone shell). For example, an optical mechanism in the personal audio device may detect the presence of light and so conclude that the personal audio device has been removed from the user's head. For example, an accelerometer in the personal audio device may detect movement which is consistent or which is inconsistent with the motion of a user's head. For example, a pressure sensor, for instance a piezoresistive or piezo-electric sensor, may detect pressure exerted on fitting an ear bud into an ear canal. For example, a capacitance sensor may detect the proximity of the ear to the personal audio device. For example, a temperature sensor may detect the warmth of the tissue of the ear canal or the warmth of the air in the ear canal cavity.

For the avoidance of doubt it will be noted here that, when the system 300 is implemented in a handset (e.g. a smartphone, or mobile or cellular phone) or other electronic host device, the loudspeaker 306 and the microphone 308 may either be integrated within the handset itself, or within earphones/headphones coupled to the handset.

Figure 4:
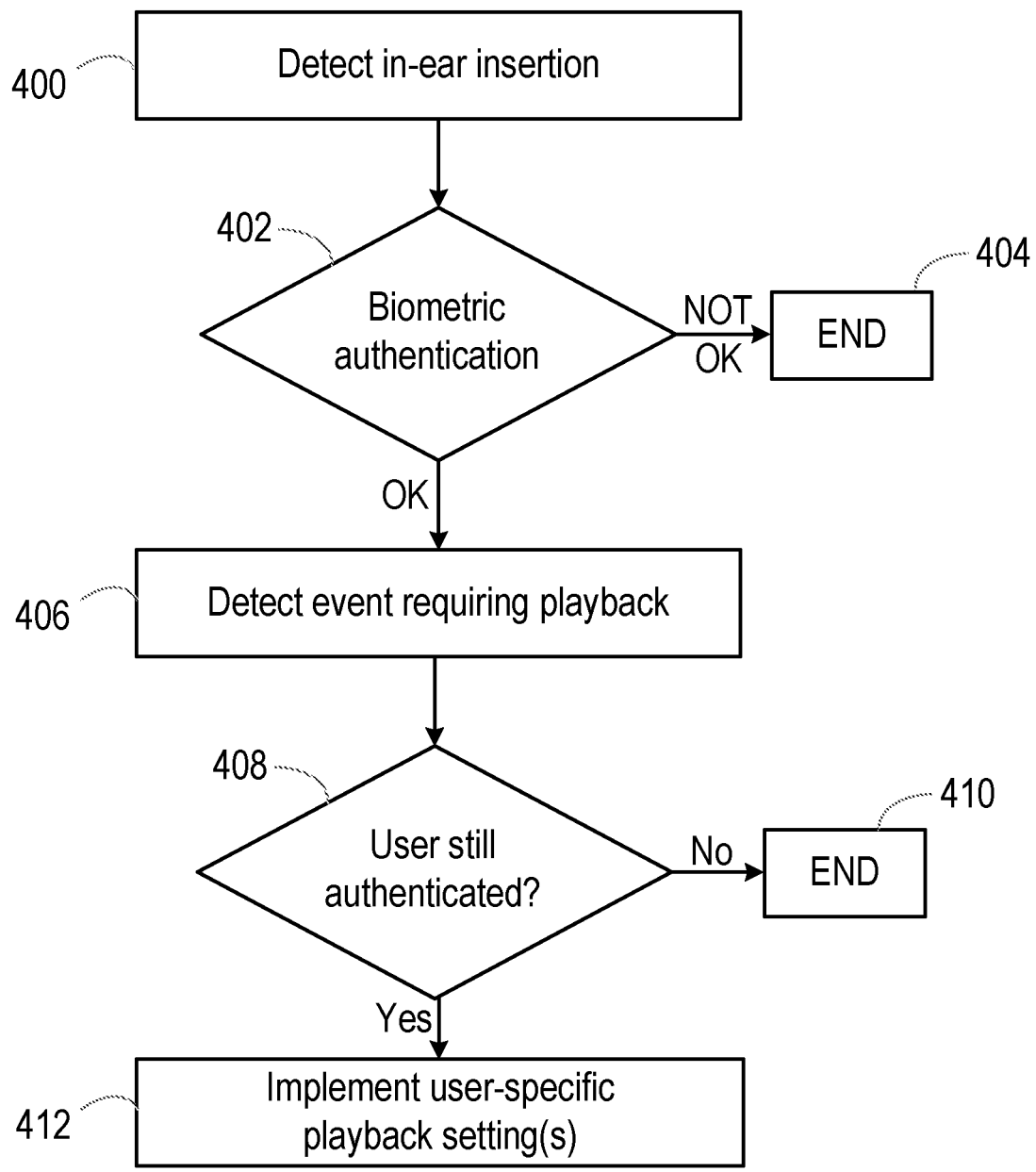
FIG. 4 is a flowchart of a method according to embodiments of the disclosure.

FIG. 4 is a flowchart of a method according to embodiments of the disclosure.

The method begins in step 400, where insertion of the personal audio device into a user's ear (or, more generally, application of the personal audio device to the user's ear) is detected. For example, the detect module 332 may detect such application of the personal audio device (i.e. at least the speaker 306 and the microphone 308) to the user's ear, and output a corresponding indication to the control module 302.

In step 402, biometric authentication is attempted using the ear biometric authentication system. Thus, the speaker 306 is controlled to output an acoustic stimulus to the user's ear (i.e. the auricle 12a and/or the ear canal 12b), and the microphone 308 detects a signal which is reflected from the user's ear. One or more features are extracted from the reflected signal (e.g. in the frequency domain) and compared to one or more stored ear prints for authorised users. If the extracted features match those of the stored ear print (i.e. to a sufficient degree), then the user may be authenticated; if the extracted features do not match (i.e. to a sufficient degree), then the user may not be authenticated.

Step 402 may take into account one or more further authentication mechanisms (which may be biometric or not) in addition to the ear biometric authentication. For example, if the ear biometric authentication fails, one or more alternative mechanisms may be attempted, such as voice biometric authentication; password, passphrase or pin number authentication, fingerprint authentication etc. The additional authentication results may be combined with the ear biometric authentication results to determine an overall authentication result.

Step 402 may be carried out responsive to the detection in step 400 of application of the personal audio device to the user's ear.

If the authentication in step 402 fails, the method proceeds to step 404 and ends. For example, one or more default audio playback settings may be utilized for audio playback to the user via the personal audio device 202. Alternatively, audio playback via the personal audio device 202 may be prevented entirely.

If the authentication is successful, the method proceeds to step 406, in which an event requiring audio playback to the user is detected.

For example, the control module 302 may detect that the user has requested audio playback of music, or text-to-speech of written text via the host electronic device 206. For example, the control module 302 may detect an event requiring notification to the user, such as receipt of an incoming message, e-mail or phone call etc.

The method proceeds to step 408, in which it is determined whether the user is still authenticated. For example, an ear biometric authentication may be carried out again, as in step 402. Alternatively, it may be determined that the personal audio device has not been removed from the user's ear since the positive authentication in step 402 (e.g. using the detect module 322), without requiring authentication of the user again. If the personal audio device has been removed since the positive authentication in step 402, a further authentication process may be required (e.g. ear biometric authentication) using the personal audio device, before the user is deemed authenticated.

If the user is not authenticated in step 408, the method proceeds to step 410 and ends. For example, one or more default audio playback settings may be utilized for audio playback to the user via the personal audio device 202. Alternatively, audio playback via the personal audio device 202 may be prevented entirely.

If the user is authenticated in step 408, the method proceeds to step 412, in which one or more audio playback settings, specific to the user identified in the authentication carried out in step 402 or step 408 (or both), is implemented. For example, the processing circuitry may take into account the output of the biometric authentication module 316, plus optionally the output of the detect module 332, to retrieve the specific playback setting(s) from the module 330.

The one or more playback settings may comprise one or more of:

Audio equalization (EQ) settings. For example, such a setting may comprise the EQ settings for music playback, or other audio playback, via the personal audio device.

Audible secure messages. For example, such a setting may comprise a setting that messages or e-mails, from all senders or from a stored set of senders, are relayed audibly to the user via the personal audio device only if the user is authenticated. Otherwise the messages or e-mails may not be relayed to the user at all, or may be notified or displayed only on the host electronic device.

Secure phone calls. For example, such a setting may comprise a setting that phone calls, from certain parties or all parties, are played back through the personal audio device only if the user is authenticated.

Audible notifications. For example, such a setting may comprise a setting that audible notifications are provided for certain events only if the user is authenticated.

Audible translation. For example, such a setting may comprise a preferred language into which audio is translated.

Text-to-speech output. For example, such a setting may comprise a preferred language into which text is translated, or a setting that text should be converted to speech and relayed to the user via the personal audio device only if the user is authenticated.

Voice assistant privacy or security settings. For example, a voice assistant implemented within the personal audio device 202 and/or the host device 206 may be operable according to a plurality of privacy or security modes. One such mode, which may be a default mode, may comprise a "public" mode in which a relatively high level of privacy is applied. For example, the voice assistant may be prevented from outputting the content of messages, or other sensitive personal information in such a mode. Another such mode may be a "private" mode, in which a relatively low level of privacy is applied. For example, the voice assistant may output the content of messages or other personal information when operating in such a mode. For example, on receiving a message for a user, a voice assistant operating in the public mode may output an alert with personalised information obfuscated or content withheld, such as "You have received a message from Mary". Subsequent to biometric authentication such as ear biometric authentication indicating proximity to authorised ear, the voice assistant may switch to the private mode, where receipt of the same message may prompt the alert to be tailored to provide more personal or private content to the user, e.g. "Your wife messages you: Please pick up some milk". The voice assistant may swap between the plurality of privacy modes in accordance with the authentication in step 408. For example, if the user is authenticated in step 408, the private mode may be applied; if the user is not authenticated in step 408, the public mode may be applied.

The method shown in FIG. 4 comprises two stages of authentication: a first stage upon application of the personal audio device 202 to the user's ear; and a second stage of authentication upon detection of an event requiring audio playback to the user. In alternative embodiments, only one stage of authentication may be required. Thus the user may be authenticated (e.g. using the ear biometric authentication system plus, optionally, one or more additional authentication mechanisms) only upon the detection of an event requiring audio playback, rather than upon application of the personal audio device to the user's ear.

Figure 5:
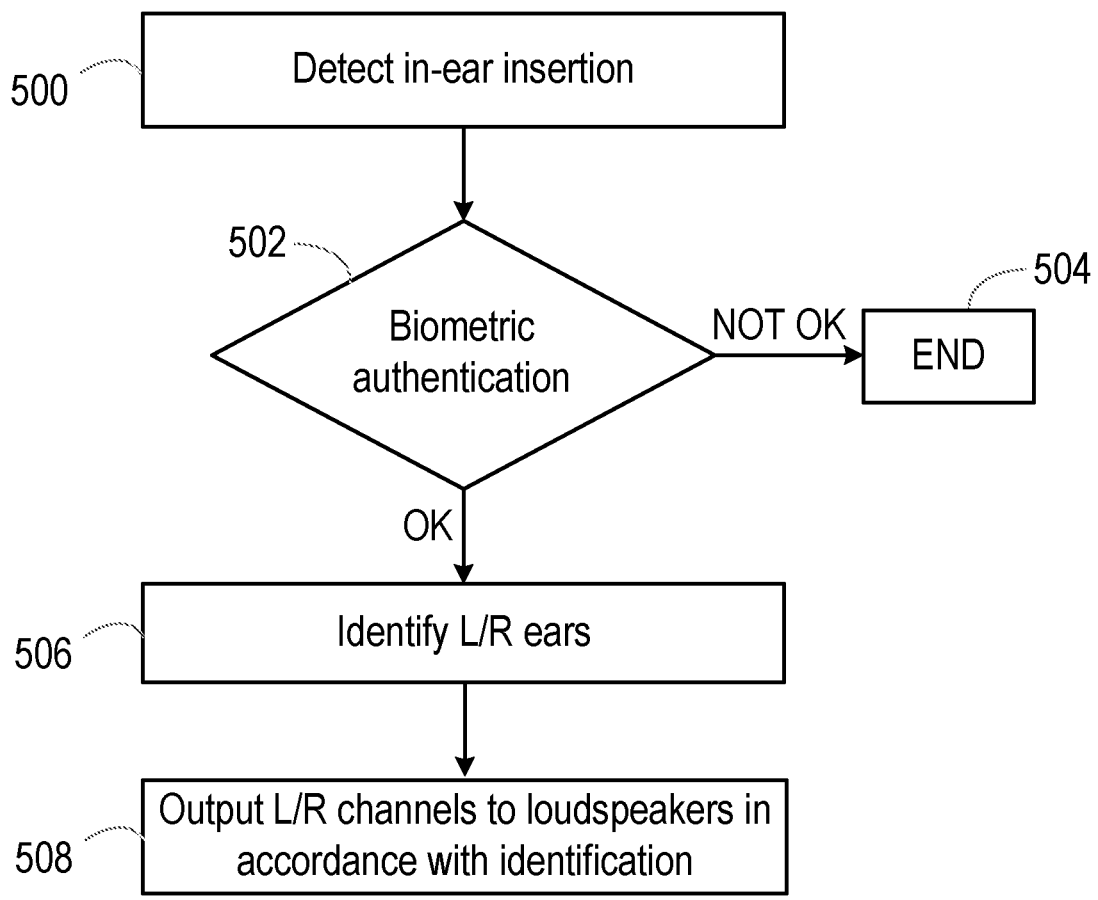
FIG. 5 is a flowchart of a method according to further embodiments of the disclosure.

FIG. 5 is a flowchart of a method according to further embodiments of the disclosure, particularly for use in or in conjunction with a personal audio device comprising first and second loudspeakers for separate playback of audio to a user's ears, i.e., where the first loudspeaker is arranged for output to the user's left ear and the second loudspeaker is arranged for output to the user's right ear, or vice versa. Thus, the method may be employed with any of the personal audio devices shown in FIGS. 1*a* to 1*d*, where the illustrated earphone/headphone is duplicated in respect of the user's other ear.

Further, the method may be performed by the system 300 shown in and described above with respect to FIG. 3. This system shows only a single loudspeaker 306 and a single microphone 308; however, it will be understood by those skilled in the art that the system 300 can be readily adapted to account for a second loudspeaker and a second microphone (i.e. associated with a second earphone or headphone). Separate signal processing paths (e.g. FFT modules, feature extract modules, etc) may be provided for each loudspeaker and microphone combination, or a single processing path may be shared between both loudspeaker and microphone combinations.

The method begins in step 500, where insertion of one (or both) of the loudspeakers of the personal audio device into a user's ear (or, more generally, application of one of the loudspeaker to the user's ear) is detected. For example, the detect module 332 may detect such application of the personal audio device (i.e. at least the speaker 306 and the microphone 308) to one of the user's ears, and output a corresponding indication to the control module 302. It will be understood by those skilled in the art that the detect module 332 may perform in-ear detect functions for one loudspeaker or both loudspeakers.

In step 502, biometric authentication is attempted using the ear biometric authentication system. Thus, the speaker 306 is controlled to output an acoustic stimulus to the user's ear (i.e. the auricle 12*a* and/or the ear canal 12*b*), and the microphone 308 detects a signal which is reflected from the user's ear. One or more features are extracted from the reflected signal (e.g. in the frequency domain) and compared to one or more stored ear prints for authorised users. If the extracted features match those of the stored ear print (i.e. to a sufficient degree), then the user may be authenticated; if the extracted features do not match (i.e. to a sufficient degree), then the user may not be authenticated. This process may be repeated for both ears (i.e. both loudspeakers/microphones), or carried out in respect of only one loudspeaker.

According to embodiments of the disclosure, the system 300 stores separate earprints for each of the user's left and right ears, e.g. in earprint module 318. The earprints can be expected to differ from each other, such that the acoustic response of a user's left ear will be different to the acoustic response of the user's right ear. The separate left and right earprints may be acquired during an enrolment procedure in which the user is required to identify his or her left and right ears (e.g., in separate enrolment procedures for each ear). Thus the biometric authentication performed in step 502 comprises comparing the acoustic response detected by microphone 308 (and optionally acoustic response detected by the second microphone as well) separately to the earprints for the user's left and right ears.

Step 502 may be carried out responsive to the detection in step 500 of application of the personal audio device to the user's ear, and particularly carried out using the loudspeaker which, it is detected, has been applied to the user's ear (in case only one loudspeaker is applied to the user's ear).

If the authentication in step 502 fails (e.g. in respect of one or both ears), the method proceeds to step 504 and ends. For example, one or more default audio playback settings may be utilized for audio playback to the user via the personal audio device 202. Alternatively, audio playback via the personal audio device 202 may be prevented entirely.

If the authentication is successful, the method proceeds to step 506, in which the user's left and/or right ears are identified, and particularly an association between each of the first and second loudspeakers and the user's left and right ears is identified. For example, if the acoustic response detected by the microphone 308 matches the earprint of the user's left ear, it may be concluded that the loudspeaker 306 is applied to the user's left ear. Thus an association between the loudspeaker 306 and the user's left ear is identified. For example, the biometric module 316 may output a suitable control signal to the control module 302 identifying the association between the loudspeaker 306 and the left or right ear of the user.

The process may be repeated in respect of the second loudspeaker or, alternatively, an association between the second loudspeaker and the other of the user's ears may be assumed. A separate authentication process in respect of the second loudspeaker may allow the system 300 to identify when the earphones are being shared between two different users, or when only a single earphone has been applied to an ear.

In step 508, specific audio playback settings are implemented in respect of the loudspeakers according to their association with left or right ears. For example, stereo audio channels (e.g. left and right channels) may be output to the loudspeakers in accordance with their association with left or right ears, the left channel being output to the loudspeaker associated with the left ear and the right channel being output to the loudspeaker associated with the right ear. In other examples, different volumes may be applied to the first and second loudspeakers, e.g., to account for a user's poor hearing in one or other ear.

Thus the control module 302 may access separate playback settings for the left and right ears, stored in the storage module 330, and output separate signals to the first and second loudspeakers according to whether those loudspeakers are associated with left or right ears.

The present disclosure thus provides methods, apparatus and systems, which take advantage of ear biometric authentication to determine who is listening via a personal audio device 202 (and particularly whether or not they are authorised), and implement one or more user-specific playback settings subsequent to positive authentication of the user as an authorised user. Further embodiments identify which ear of a particular user is associated with which loudspeaker of the personal audio device, and implement one or more ear-specific playback settings for each loudspeaker in accordance with that identification.

Embodiments may be implemented in an electronic, portable and/or battery powered host device such as a smartphone, an audio player, a mobile or cellular phone, a handset. Embodiments may be implemented on one or more integrated circuits provided within such a host device. Embodiments may be implemented in a personal audio device 202 configurable to provide audio playback to a single person, such as a smartphone, a mobile or cellular phone, headphones, earphones, etc., see FIGS. 1*a* to 1*e*. Again, embodiments may be implemented on one or more integrated circuits provided within such a personal audio device 202. In yet further alternatives, embodiments may be implemented in a combination of a host device 206 and a personal audio device 202. For example, embodiments may be implemented in one or more integrated circuits provided within the personal audio device 202, and one or more integrated circuits provided within the host device 206.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure makes reference to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments likewise, with the benefit of this disclosure, will be apparent to those having ordinary skill in the art, and such embodiments should be deemed as being encompassed herein.

The skilled person will recognise that some aspects of the above-described apparatus and methods, for example the discovery and configuration methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

Although the present disclosure and certain representative advantages have been described in detail, it should be understood that various changes, substitutions, and alterations can be made herein without departing from the spirit and scope of the disclosure as defined by the appended claims. Moreover, the scope of the present disclosure is not intended to be limited to the particular embodiments of the process, machine, manufacture, compositions of matter, means, methods, or steps, presently existing or later to be developed that perform substantially the same function or achieve substantially the same result as the corresponding embodiments herein may be utilized. Accordingly, the appended claims are intended to include within their scope such processes, machines, manufacture, compositions of matter, means, methods, or steps.

The invention claimed is:

1. A method in an authentication system for authentication of a user, using a personal audio device for playback into a user's ear, the method comprising:
   obtaining ear biometric data based on one or more features extracted from a measured response of the user's ear to an acoustic stimulus applied to the user's ear;
   attempting to authenticate the user with the authentication system based on the ear biometric data;
   responsive to successful authentication of the user as an authorised user with the authentication system, controlling the personal audio device to output an audio playback signal to the user with one or more user-specific playback settings which are specific to the authorised user, for playback to the authorised user via the personal audio device; and
   responsive to unsuccessful authentication of the user with the authentication system, controlling the personal audio device to output an audio playback signal to the user with one or more default playback settings, wherein the one or more user-specific playback settings comprise one or more of: audible secure messages; secure phone calls; and voice assistant privacy modes.

2. The method of claim 1, further comprising controlling the personal audio device to generate the acoustic stimulus for application to the user's ear.

3. The method according to claim 1, wherein the step of attempting to authenticate the user is carried out responsive to detection of an event requiring playback to the user.

4. The method according to claim 1, wherein the step of attempting to authenticate the user is carried out upon application of the personal audio device to the user's ear.

5. The method according to claim 1, wherein the step of controlling the personal audio device to output the audio playback signal to the user is carried out responsive to detection of an event requiring playback to the user.

6. The method according to claim 1, wherein the one or more user-specific playback settings are implemented responsive to a determination that the personal audio device remains continuously applied to the user's ear following the successful authentication of the user.

7. The method of claim 1, wherein the one or more user-specific playback settings are replaced with the one or more default playback settings responsive to a determination that the personal audio device has been removed from application to the user's ear following successful authentication of the user.

8. The method according to claim 1, wherein successful authentication comprises successful authentication with the authentication system and at least one additional authentication mechanism.

9. The method according to claim 8, wherein the at least one additional authentication mechanism comprises one or more of: pin authentication; passphrase or password authentication; and voice authentication.

10. The method according to claim 1, wherein the acoustic stimulus comprises an audio playback signal.

11. The method according to claim 10, wherein the audio playback signal comprises music.

12. The method according to claim 1, wherein the personal audio device comprises a microphone for the detection of the measured response, and wherein the microphone is further utilized as part of an active noise cancellation system.

13. An electronic apparatus for authenticating a user, using a personal audio device for playback into a user's ear, the system comprising processing circuitry and a non-transitory machine-readable medium storing instructions which, when executed by the processing circuitry, cause an authentication system to:
   obtain ear biometric data based on one or more features extracted from a measured response of the user's ear to an acoustic stimulus;
   attempting to authenticate the user based on the ear biometric data;
   responsive to successful authentication of the user as an authorised user, control the personal audio device to output an audio playback signal to the user with one or more user-specific playback settings which are specific to the authorised user, for playback to the authorised user via the personal audio device; and
   responsive to unsuccessful authentication of the user with the authentication system, controlling the personal audio device to output an audio playback signal to the user with one or more default playback settings, wherein the one or more user-specific playback settings comprise one or more of: audible secure messages; secure phone calls; voice assistant privacy modes.

14. The electronic apparatus of claim 13, wherein the biometric data is obtained from the personal audio device.

15. The electronic apparatus of claim 13, wherein the instructions, when executed by the processing circuitry, cause the authentication system to:
   control the personal audio device to generate the acoustic stimulus for application to the user's ear.

16. The electronic apparatus of claim 13, wherein the one or more user-specific playback settings are implemented responsive to a determination that the personal audio device remains continuously applied to the user's ear following the successful authentication of the user.

17. The electronic apparatus of claim 13, wherein successful authentication comprises successful authentication with the authentication system and at least one additional authentication mechanism.

18. The electronic apparatus of claim 13, wherein the acoustic stimulus comprises an audio playback signal.

19. The electronic apparatus of claim 13, wherein the personal audio device comprises a microphone for the detection of the measured response, and wherein the microphone is further utilized as part of an active noise cancellation system.

20. A method in an authentication system for authentication of a user, using a personal audio device for playback into a user's ear, the method comprising:

using detection circuitry, detecting application of the personal audio device to the user's ear;

upon detecting application of the personal audio device to the user's ear, obtaining ear biometric data based on one or more features extracted from a measured response of the user's ear to an acoustic stimulus applied to the user's ear;

detecting an event requiring output of an audio playback signal to the user;

upon detecting the event, obtaining additional ear biometric data based on one or more additional features extracted from a measured response of the user's ear to an additional acoustic stimulus applied to the user's ear;

attempting to authenticate the user with the authentication system based on the ear biometric data and the additional ear biometric data; and responsive to successful authentication of the user as an authorised user with the authentication system, controlling the personal audio device to output the audio playback signal to the user;

wherein authentication of the user comprises:

performing a first comparison of the ear biometric data to a stored ear print of an enrolled user;

performing a second comparison of the additional ear biometric data to the stored ear print of the enrolled user; and authenticating the user based on the first and second comparisons.

* * * * *